US009242639B2

United States Patent
Fushiki

(10) Patent No.: US 9,242,639 B2
(45) Date of Patent: Jan. 26, 2016

(54) HYBRID VEHICLE AND CONTROL METHOD FOR HYBRID VEHICLE

(71) Applicant: Shunsuke Fushiki, Susono (JP)

(72) Inventor: Shunsuke Fushiki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 316 days.

(21) Appl. No.: 13/855,369

(22) Filed: Apr. 2, 2013

(65) Prior Publication Data

US 2013/0274977 A1 Oct. 17, 2013

(30) Foreign Application Priority Data

Apr. 13, 2012 (JP) ................................. 2012-092082

(51) Int. Cl.
| | |
|---|---|
| *F02M 33/02* | (2006.01) |
| *F02M 25/08* | (2006.01) |
| *B60W 20/00* | (2006.01) |
| *B60W 10/06* | (2006.01) |
| *B60W 10/08* | (2006.01) |
| *B60K 6/445* | (2007.10) |

(52) U.S. Cl.
CPC .............. *B60W 20/108* (2013.01); *B60K 6/445* (2013.01); *B60W 10/06* (2013.01); *B60W 10/08* (2013.01); *B60W 20/1082* (2013.01); *B60W 20/1086* (2013.01); *B60W 2510/0661* (2013.01); *B60W 2510/0676* (2013.01); *B60W 2540/106* (2013.01); *B60W 2600/00* (2013.01); *B60W 2710/0622* (2013.01); *B60W 2710/0627* (2013.01); *Y02T 10/48* (2013.01); *Y02T 10/6239* (2013.01); *Y02T 10/6286* (2013.01); *Y10S 903/93* (2013.01)

(58) Field of Classification Search
USPC ................................... 123/518, 519, 520, 521
See application file for complete search history.

(56) References Cited

U.S. PATENT DOCUMENTS

| | | | | | |
|---|---|---|---|---|---|
| 4,377,142 | A | * | 3/1983 | Otsuka et al. | 123/689 |
| 5,216,998 | A | * | 6/1993 | Hosoda | F02M 25/08 |
| | | | | | 123/520 |
| 5,273,018 | A | * | 12/1993 | Suzuki | F02D 41/0032 |
| | | | | | 123/516 |
| 5,351,193 | A | * | 9/1994 | Poirier | F02D 41/004 |
| | | | | | 123/519 |
| 5,520,594 | A | * | 5/1996 | Fukasawa et al. | 477/173 |

(Continued)

FOREIGN PATENT DOCUMENTS

| | | |
|---|---|---|
| JP | 09-308012 A | 11/1997 |
| JP | 2005-240589 A | 9/2005 |

(Continued)

*Primary Examiner* — John Kwon
*Assistant Examiner* — Tea Holbrook
(74) *Attorney, Agent, or Firm* — Dinsmore & Shohl LLP

(57) ABSTRACT

A hybrid vehicle intermittently operates and stops an engine, travels through control over torque generated by the engine and torque generated by a second motor generator, causes a fuel vapor gas purge system to carry out purging of fuel vapor gas when a predetermined condition, including a condition that a coolant temperature is higher than or equal to a permissible temperature, is satisfied, and sets the permissible temperature to a value lower when a specific driving operation state that includes a state where the number of times of accelerator operation per unit time is higher than or equal to a threshold has been detected than when the specific driving operation state has not been detected. When the specific driving operation state has been detected, the hybrid vehicle increases the updating rate of a concentration learned value of fuel vapor gas, and decreases the rate of increase in target purge rate.

3 Claims, 9 Drawing Sheets

(56) References Cited

U.S. PATENT DOCUMENTS

| | | | |
|---|---|---|---|
| 5,626,122 A * | 5/1997 | Azuma | F02D 41/0045 123/685 |
| 6,044,831 A * | 4/2000 | Takagi | F02D 41/0032 123/520 |
| 6,131,680 A | 10/2000 | Nii et al. | |
| 6,176,217 B1 * | 1/2001 | Ohkuma | F02M 25/08 123/295 |
| 6,421,599 B1 * | 7/2002 | Lippa et al. | 701/102 |
| 8,972,089 B2 * | 3/2015 | Ando et al. | 701/22 |
| 2002/0079149 A1 * | 6/2002 | Kotre | B60K 6/445 180/65.235 |
| 2002/0162457 A1 * | 11/2002 | Hyodo et al. | 96/109 |
| 2003/0140901 A1 * | 7/2003 | Amano et al. | 123/520 |
| 2005/0065708 A1 * | 3/2005 | Hanazaki | F02D 41/0042 701/109 |
| 2005/0066949 A1 * | 3/2005 | Suzuki | F02D 41/0002 123/698 |
| 2005/0183698 A1 | 8/2005 | Yonezawa | |
| 2005/0211228 A1 * | 9/2005 | Amano et al. | 123/520 |
| 2005/0284445 A1 | 12/2005 | Ozaki et al. | |
| 2006/0051635 A1 * | 3/2006 | Kamihara | 429/25 |
| 2006/0225714 A1 * | 10/2006 | Kano | F02M 25/0809 123/520 |
| 2007/0255485 A1 * | 11/2007 | Kaita | B60K 6/445 701/102 |
| 2008/0271718 A1 * | 11/2008 | Schondorf et al. | 123/520 |
| 2009/0292449 A1 * | 11/2009 | Yamazaki | B60K 6/445 701/103 |
| 2010/0094493 A1 * | 4/2010 | Atsumi | 701/22 |
| 2010/0241297 A1 | 9/2010 | Aoki et al. | |
| 2011/0232611 A1 * | 9/2011 | Shaikh et al. | 123/520 |
| 2012/0109498 A1 | 5/2012 | Murase | |
| 2013/0189595 A1 * | 7/2013 | Izuhara et al. | 429/413 |
| 2013/0274977 A1 * | 10/2013 | Fushiki | 701/22 |

FOREIGN PATENT DOCUMENTS

| | | |
|---|---|---|
| JP | 2006-009668 A | 1/2006 |
| JP | 2007-077883 A | 3/2007 |
| JP | 2008201300 A | 9/2008 |
| JP | 2009-001207 A | 1/2009 |
| JP | 2009-126450 A | 6/2009 |
| JP | 2009-281312 A | 12/2009 |
| JP | 2010-281287 A | 12/2010 |
| JP | 2011012628 A | 1/2011 |
| JP | 2011-057115 A | 3/2011 |
| JP | 2011-057116 A | 3/2011 |

\* cited by examiner

HYBRID VEHICLE AND CONTROL METHOD FOR HYBRID VEHICLE

INCORPORATION BY REFERENCE

The disclosure of Japanese Patent Application No. 2012-092082 filed on Apr. 13, 2012 including the specification, drawings and abstract is incorporated herein by reference in its entirety.

BACKGROUND OF THE INVENTION

1. Field of the Invention

The invention relates to a hybrid vehicle that includes an internal combustion engine and an electric motor as drive sources and that includes a fuel vapor gas purge system for purging fuel vapor produced inside a fuel tank, and a control method for the hybrid vehicle.

2. Description of Related Art

One of hybrid vehicles is able to travel with only the power of an electric motor while the operation of an internal combustion engine is stopped (hereinafter, referred to as "electric travel") and to travel with both the power of the internal combustion engine and the power of the electric motor (hereinafter, referred to as "hybrid travel").

More specifically, the hybrid vehicle starts hybrid travel by starting the engine when a vehicle required power that varies with an accelerator operation amount and a vehicle speed becomes larger than or equal to a start power threshold, and performs electric travel by stopping the operation of the engine when the vehicle required power becomes smaller than or equal to a stop power threshold during hybrid travel. That is, the hybrid vehicle operates the engine when the engine can be efficiently operated and/or when sufficient vehicle driving force is not obtained from only the electric motor, and stops the operation of the engine when the engine cannot be efficiently operated and/or when sufficient vehicle driving force is obtained from only the electric motor (for example, see Japanese Patent Application Publication No. 2006-9668 (JP 2006-9668 A)). In this way, the hybrid vehicle intermittently operates the engine. That is, the hybrid vehicle executes intermittent operation of the engine.

On the other hand, the hybrid vehicle includes a chargeable electrical storage device (for example, battery) that is able to supply electric power to the electric motor. Furthermore, in recent years, there has been developed a hybrid vehicle that allows the electrical storage device to be charged with electric power that is supplied from the outside of the vehicle (so-called plug-in hybrid vehicle). Hereinafter, charging the electrical storage device with electric power that is supplied from the outside of the vehicle is also referred to as "external charging".

When external charging is performed, the electrical storage device is mostly placed in a state close to a full charge state, so the remaining level of the electrical storage device is high. Therefore, the hybrid vehicle travels in an EV mode (CD mode) in which electric travel is given a higher priority than hybrid travel until the remaining level of the electrical storage device decreases to a mode change threshold after external charging. After that, when the remaining level of the electrical storage device becomes lower than or equal to the mode change threshold, the hybrid vehicle travels in an HV mode (CS mode).

For example, in the EV mode, the start power threshold and the stop power threshold are respectively set so as to be higher than the start power threshold and the stop power threshold in the HV mode. Thus, when the hybrid vehicle travels in the EV mode, a state where the engine is not operated frequently occurs.

On the other hand, the internal combustion engine mounted on the hybrid vehicle, as well as an internal combustion engine mounted on an ordinary vehicle, includes a fuel vapor gas purge system that introduces fuel vapor, produced inside a fuel tank, into an intake passage of the internal combustion engine (that is, the fuel vapor gas purge system purges fuel vapor gas). Fuel vapor gas is purged when the load of the engine is stable, and purging of fuel vapor gas is stopped when a variation in the load is large.

When fuel cut control is ended by changing the accelerator operation amount from zero to non-zero and fuel vapor gas starts to be purged immediately after the end of fuel cut control, the air-fuel ratio of air-fuel mixture that is supplied to the engine significantly fluctuates. In one related art, fuel vapor gas starts to be purged after a lapse of a predetermined period of time from an end of fuel cut control. Furthermore, in the related art, when a predetermined operation state in which fuel cut control is frequently executed through a frequent change of the accelerator operation amount has been detected, the period of time from the end of fuel cut control to the start of purging fuel vapor gas is shortened as compared with that in an ordinary operation state. Because the accelerator operation amount is frequently changed in the predetermined operation state, even when the air-fuel ratio slightly fluctuates due to an early start of purging fuel vapor gas, it is less likely that a driver feels torque fluctuations. As a result, according to the related art, it is possible to reliably purge fuel vapor gas while not making the driver experience torque fluctuations.

Incidentally, there is a driver who drives a vehicle while frequently changing the accelerator operation amount although the driver does not intend to change the vehicle speed by a large amount. That is, although such a driver does not intend to change the vehicle speed by a large amount, the driver frequently changes the accelerator operation amount from zero to non-zero or from non-zero to zero. Such a driving operation is also referred to as "aggressive driving operation (specific driving operation) or aggressive accelerator operation". When aggressive driving operation is performed, a variation in the load of the engine increases, so purging of fuel vapor gas is frequently stopped. In addition, as described above, in the hybrid vehicle, the operation of the engine is frequently stopped through intermittent operation, so the hybrid vehicle has a smaller number of opportunities to purge fuel vapor gas than the ordinary vehicle that includes only the internal combustion engine as the drive source. From above, when aggressive driving operation is performed in the hybrid vehicle, the amount of purged fuel vapor gas may be insufficient.

SUMMARY OF THE INVENTION

A hybrid vehicle and a control method for the hybrid vehicle are made in order to take measures against the above-described inconvenience. That is, the invention provides a hybrid vehicle that is able to appropriately purge fuel vapor gas even when aggressive driving operation is performed, and also provides a control method for the hybrid vehicle.

A first aspect of the invention provides a hybrid vehicle (hereinafter, referred to as "the hybrid vehicle") that includes an internal combustion engine and an electric motor as drive sources and that includes a fuel vapor gas purge system that carries out purging of fuel vapor gas for introducing fuel vapor produced inside a fuel tank, which stores fuel that is supplied to the engine, into an intake passage of the engine.

The hybrid vehicle further includes a drive control unit and a purge control unit. The drive control unit is configured to carry out intermittent operation for stopping operation of the engine when a predetermined operation stop condition is satisfied and starting the operation of the engine when a predetermined start condition is satisfied, and is configured to cause the hybrid vehicle to travel by applying torque based on an accelerator operation amount to a drive shaft through control over torque that is generated by the engine and torque that is generated by the electric motor.

The purge control unit is configured to carry out the purging of fuel vapor gas when a temperature of the engine (for example, a coolant temperature) is higher than or equal to a permissible temperature and a variation per unit time in a load of the engine is smaller than a first threshold. In addition, the purge control unit is configured to set the permissible temperature to a value lower when a specific driving operation state (aggressive driving operation state) has been detected than when the specific driving operation state has not been detected, the specific driving operation state including a state where the number of times the accelerator operation amount has changed from zero to non-zero per unit time or the number of times the accelerator operation amount has changed from non-zero to zero per unit time is larger than or equal to a predetermined second threshold.

Another aspect of the invention provides a control method for a hybrid vehicle that includes an internal combustion engine and an electric motor as drive sources and that includes a fuel vapor gas purge system that carries out purging of fuel vapor gas for introducing fuel vapor produced inside a fuel tank, which stores fuel that is supplied to the engine, into an intake passage of the engine. The control method includes: carrying out intermittent operation for stopping operation of the engine when a predetermined operation stop condition is satisfied and starting the operation of the engine when a predetermined start condition is satisfied, and causing the hybrid vehicle to travel by applying torque based on an accelerator operation amount to a drive shaft through control over torque that is generated by the engine and torque that is generated by the electric motor; carrying out the purging of fuel vapor gas when a temperature of the engine is higher than or equal to a permissible temperature and when a variation per unit time in a load of the engine is smaller than a first threshold; and setting the permissible temperature to a value lower when a specific driving operation state has been detected than when the specific driving operation state has not been detected, the specific driving operation state including a state where the number of times the accelerator operation amount has changed from zero to non-zero per unit time or the number of times the accelerator operation amount has changed from non-zero to zero per unit time is larger than or equal to a predetermined second threshold.

With the above hybrid vehicle and the control method therefor, fuel vapor gas starts to be purged at the time point at which the temperature of the engine is lower when the specific driving operation state has been detected than when the specific driving operation state has not been detected. That is, when the specific driving operation state has been detected, it is possible to advance the timing at which fuel vapor gas starts to be purged. As a result, even when aggressive driving operation in which the frequency of purging fuel vapor gas is low because a variation in load per unit time increases, it is possible to ensure the amount of purge of fuel vapor gas.

In the hybrid vehicle, the drive control unit may include an injection amount control unit configured to calculate a basic fuel injection amount on the basis of an intake air amount of the engine, calculate a feedback correction amount for correcting an amount of fuel that is injected from a fuel injection valve in a feedback manner such that an air-fuel ratio that is indicated by an output value of an air-fuel ratio sensor arranged in an exhaust passage of the engine coincides with a predetermined target air-fuel ratio, learn a concentration of the fuel vapor gas as a concentration learned value on the basis of the feedback correction amount in a period during which the purging of fuel vapor gas is being carried out, and determine the amount of fuel that is injected from the fuel injection valve by correcting the basic fuel injection amount using the feedback correction amount and a purge correction amount that is set on the basis of the concentration learned value.

Furthermore, the injection amount control unit may be configured to increase an updating rate of the concentration learned value when the specific driving operation state has been detected as compared with when the specific driving operation state has not been detected.

With the above hybrid vehicle, when the timing at which purging of fuel vapor gas is started is advanced because aggressive driving operation is performed, it is possible to early increase the accuracy of the concentration learned value. As a result, it is possible to set a proper fuel injection amount, so it is possible to suppress deterioration of emissions. In addition, the amount of purge of fuel vapor gas (for example, a target purge rate) is set on the basis of the concentration learned value, it is possible to properly set the amount of purge of fuel vapor gas.

In the hybrid vehicle, the purge control unit may be configured to gradually increase the ratio of a flow rate of fuel vapor gas that is introduced into the intake passage with respect to an intake air flow rate of the engine (that is, a purge rate), from time point at which the temperature of the engine becomes higher than or equal to the permissible temperature. In this case, the purge control unit may be configured to reduce a rate of increase in the purge rate when the specific driving operation state has been detected as compared with when the specific driving operation state has not been detected.

With the hybrid vehicle and the control method therefor, fuel vapor gas starts to be purged at earlier time point when the specific driving operation state has been detected. However, when the purge rate is increased as in the case of an ordinary time when the specific driving operation state has not been detected, emissions may deteriorate. In contrast to this, with the above hybrid vehicle and control method, the rate of increase in purge rate is decreased when the specific driving operation state has been detected, so it is possible to suppress deterioration of emissions.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
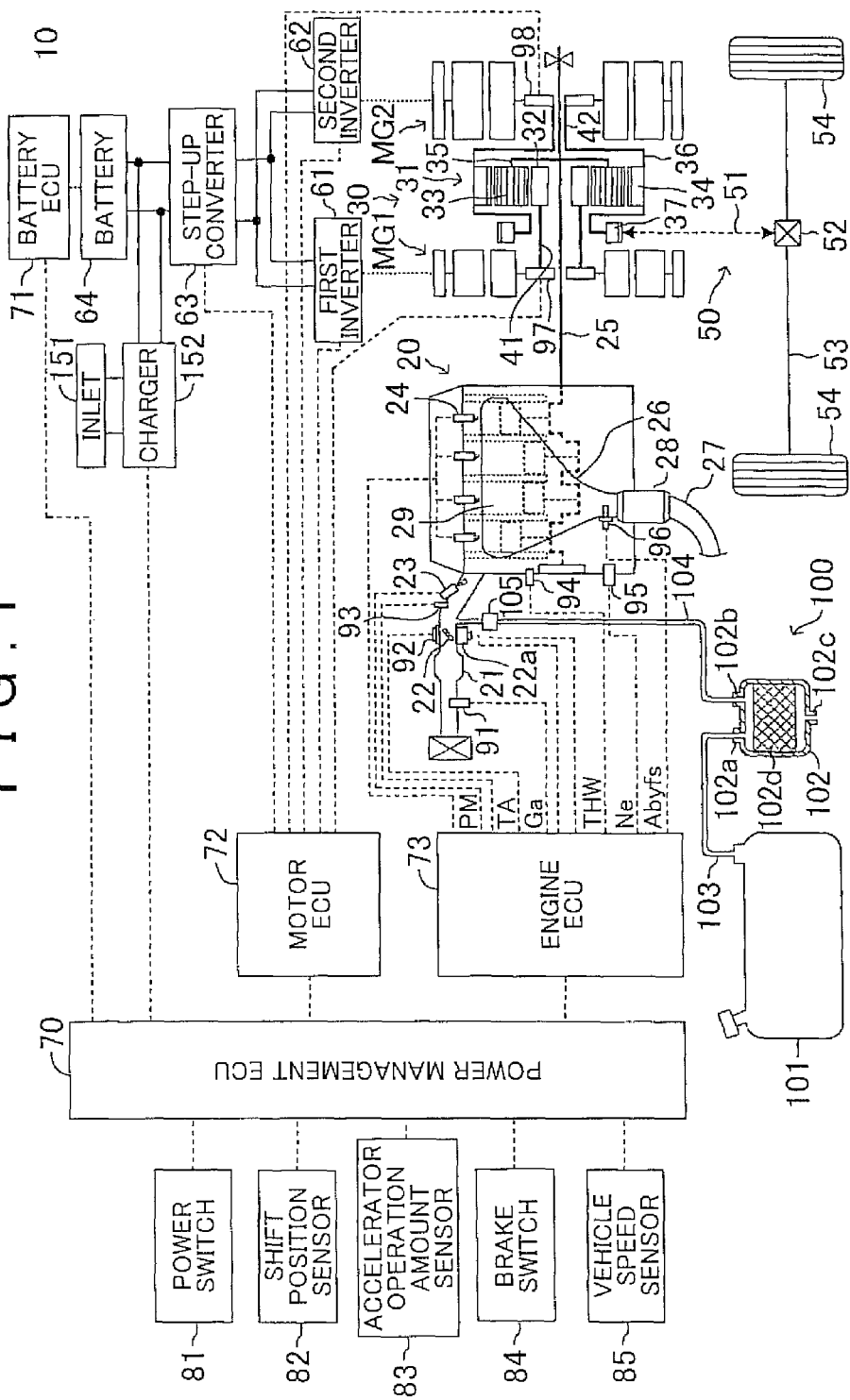
FIG. 1 is a schematic view of a hybrid vehicle according to an embodiment of the invention.

Hereinafter, a vehicle according to an embodiment of the invention will be described with reference to the accompanying drawings. As shown in FIG. 1, the vehicle 10 according to the embodiment of the invention is a hybrid vehicle (plug-in hybrid vehicle). The vehicle 10 is able to travel in any one of an EV mode (CD mode, first travel mode) and an HV mode (CS mode, second travel mode).

First, the configuration of the vehicle according to the embodiment of the invention will be described. As shown in FIG. 1, the hybrid vehicle 10 includes a first motor generator MG1, a second motor generator MG2, an internal combustion engine 20, a power distribution mechanism 30, a driving force transmission mechanism 50, a first inverter 61, a second inverter 62, a step-up converter 63, a battery 64, a power management ECU 70, a battery ECU 71, a motor ECU 72, an engine ECU 73, and the like.

The word "ECU" is an abbreviation of electronic control unit, and is an electronic control circuit that has a microcomputer as a major component. The microcomputer includes a CPU, a ROM, a RAM, a backup RAM (or a nonvolatile memory), an interface, and the like. The backup RAM is able to hold data irrespective of whether an ignition key switch (not shown) of the vehicle 10 is in an on state or in an off state.

The first motor generator MG1 (motor generator) is a synchronous motor generator that is able to function as not only a generator but also an electric motor. The first motor generator MG1 mainly functions as a generator in the present embodiment. The first motor generator MG1 includes an output shaft (hereinafter, also referred to as "first shaft") 41.

The second motor generator MG2 (motor generator), as well as the first motor generator MG1, is a synchronous motor generator that is able to function as not only a generator but also an electric motor. The second motor generator MG2 mainly functions as an electric motor in the present embodiment. The second motor generator MG2 includes an output shaft (hereinafter, also referred to as "second shaft") 42.

The engine 20 is a four-cycle spark-ignition multi-cylinder internal combustion engine. The engine 20 includes an intake passage unit 21, a throttle valve 22, a throttle valve actuator 22a, a plurality of fuel injection valves 23, a plurality of ignition devices 24, a crankshaft 25, an exhaust manifold 26, an exhaust pipe 27 and an upstream three-way catalyst 28. The intake passage unit 21 includes an intake pipe and an intake manifold. The plurality of ignition devices 24 each include an ignition plug. The crankshaft 25 is the output shaft of the engine 20. Note that the engine 20 may include a variable intake valve timing control device (VVT) (not shown) and a downstream three-way catalyst.

The throttle valve 22 is rotatably supported in the intake passage unit 21. The throttle valve actuator 22a is able to change the passage cross-sectional area of the intake passage unit 21 by rotating the throttle valve 22 in response to an instruction signal from the engine ECU 73.

Each of the plurality of fuel injection valves 23 is arranged such that the injection hole of each fuel injection valve 23 is exposed in a corresponding one of intake ports that respectively communicate with combustion chambers. Each fuel injection valve 23 is configured to inject fuel of an instructed fuel injection amount into the corresponding intake port on the basis of a fuel injection instruction signal. The instructed fuel injection amount is included in the fuel injection instruction signal. Fuel is supplied from a fuel tank 101 (described later) to the fuel injection valves 23.

Each of the plurality of ignition devices 24 is configured to generate ignition spark in the combustion chamber of a corresponding one of the cylinders at predetermined timing in response to an instruction signal from the engine ECU 73.

The upstream three-way catalyst 28 is an exhaust gas purification catalyst, and is arranged at an exhaust gas collecting portion of the exhaust manifold 26. The downstream side of the catalyst 28 is connected to the exhaust pipe 27. That is, the catalyst 28 is provided in an exhaust passage of the engine 20. The catalyst 28 purifies unburned substances (HC, CO, and the like) and NOx that are emitted from the engine 20.

The engine 20 is able to change the output torque and engine rotation speed of the engine 20 (thus, engine power) by, for example, changing a fuel injection amount and changing an intake air amount through changing the opening degree of the throttle valve 22 with the use of the throttle valve actuator 22a.

The power distribution mechanism 30 includes a known planetary gear unit 31. The planetary gear unit 31 includes a sun gear 32, a plurality of planetary gears 33 and a ring gear 34.

The sun gear 32 is connected to the first shaft 41 of the first motor generator MG1. Thus, the first motor generator MG1 is able to output torque to the sun gear 32. Furthermore, the first motor generator MG1 can be driven for rotation by torque that is input from the sun gear 32 to the first motor generator MG1 (first shaft 41). The first motor generator MG1 is able to generate electric power as the first motor generator MG1 is driven for rotation by torque that is input from the sun gear 32 to the first motor generator MG1.

Each of the plurality of planetary gears 33 is in mesh with the sun gear 32 and is in mesh with the ring gear 34. A rotary shaft (rotation shaft) of each planetary gear 33 is provided on a planetary carrier 35. The planetary carrier 35 is retained so as to be rotatable coaxially with the sun gear 32. Thus, each planetary gear 33 is able to revolve around the sun gear 32 while rotating around its axis. The planetary carrier 35 is connected to the crankshaft 25 of the engine 20. Thus, each planetary gear 33 can be driven for rotation by torque that is input from the crankshaft 25 to the planetary carrier 35. The ring gear 34 is retained so as to be rotatable coaxially with the sun gear 32.

As described above, each planetary gear 33 is in mesh with the sun gear 32 and the ring gear 34. Thus, when torque is input from the planetary gears 33 to the sun gear 32, the sun gear 32 is driven for rotation by the torque. When torque is input from the planetary gears 33 to the ring gear 34, the ring gear 34 is driven for rotation by the torque. Conversely, when torque is input from the sun gear 32 to the planetary gears 33, the planetary gears 33 are driven for rotation by the torque. When torque is input from the ring gear 34 to the planetary gears 33, the planetary gears 33 are driven for rotation by the torque.

The ring gear 34 is connected to the second shaft 42 of the second motor generator MG2 via a ring gear carrier 36. Thus, the second motor generator MG2 is able to output torque to the ring gear 34. Furthermore, the second motor generator MG2 can be driven for rotation by torque that is input from the ring gear 34 to the second motor generator MG2 (second shaft 42). Furthermore, the second motor generator MG2 is able to generate electric power as the second motor generator MG2 is driven for rotation by torque input from the ring gear 34 to the second motor generator MG2.

Furthermore, the ring gear 34 is connected to an output gear 37 via the ring gear carrier 36. Thus, the output gear 37 can be driven for rotation by torque input from the ring gear 34 to the output gear 37. The ring gear 34 can be driven for rotation by torque that is input from the output gear 37 to the ring gear 34.

The driving force transmission mechanism 50 includes a gear train 51, a differential gear 52 and a drive shaft 53. The gear train 51 couples the output gear 37 to the differential gear 52 by a gear mechanism such that power is transmittable. The differential gear 52 is connected to the drive shaft 53. Drive wheels 54 are respectively connected to both ends of the drive shaft 53. Thus, torque from the output gear 37 is transmitted to the drive wheels 54 via the gear train 51, the differential gear 52 and the drive shaft 53. The hybrid vehicle 10 is able to travel by using the torque transmitted to the drive wheels 54.

The first inverter 61 is electrically connected to the first motor generator MG1 and the step-up converter 63. Thus, when the first motor generator MG1 is generating electric power, electric power generated by the first motor generator MG1 is supplied to the battery 64 via the first inverter 61 and the step-up converter 63. Conversely, the first motor generator MG1 is driven for rotation by electric power supplied from the battery 64 via the step-up converter 63 and the first inverter 61.

The second inverter 62 is electrically connected to the second motor generator MG2 and the step-up converter 63. Thus, when the second motor generator MG2 is generating electric power, electric power generated by the second motor generator MG2 is supplied to the battery 64 via the second inverter 62 and the step-up converter 63. Conversely, the second motor generator MG2 is driven for rotation by electric power supplied from the battery 64 via the step-up converter 63 and the second inverter 62.

Note that it is possible to directly supply electric power generated by the first motor generator MG1 to the second motor generator MG2, and it is possible to directly supply electric power generated by the second motor generator MG2 to the first motor generator MG1.

The battery 64 is a lithium ion battery in the present embodiment. However, the battery 64 just needs to be a chargeable and dischargeable electrical storage device, and may be a nickel metal hydride battery or another secondary battery.

The power management ECU 70 (hereinafter, referred to as "PMECU 70") is connected to the battery ECU 71, the motor ECU 72 and the engine ECU 73 so as to be able to exchange information with them through communication.

The PMECU 70 is connected to a power switch 81, a shift position sensor 82, an accelerator operation amount sensor 83, a brake switch 84, a vehicle speed sensor 85, and the like, and receives output signals generated by these sensors.

The power switch 81 is a system start-up switch of the hybrid vehicle 10. The PMECU 70 is configured to start up the system (make the system enter a ready-on state) when a vehicle key (not shown) is inserted into a key slot (not shown) and the power switch 81 is operated while a brake pedal (not shown) is depressed. In a system start-up state, the hybrid vehicle 10 is able to travel.

The shift position sensor 82 generates a signal that indicates a shift position selected by a shift lever (not shown) that is provided near a driver seat of the hybrid vehicle 10 so as to be operational by a driver. The shift position includes P (parking position), R (reverse position), N (neutral position) and D (driving position).

The accelerator operation amount sensor 83 generates an output signal that indicates an operation amount (accelerator operation amount AP) of an accelerator pedal (not shown) provided so as to be operational by the user. The accelerator operation amount AP may be referred to as acceleration operation amount. The brake switch 84 generates an output signal that indicates that the brake pedal (not shown) is in an operated state when the brake pedal provided so as to be operational by the user is operated. The vehicle speed sensor 85 generates an output signal that indicates a vehicle speed SPD of the hybrid vehicle 10.

The PMECU 70 receives a remaining level (state of charge) SOC of the battery 64, which is estimated or calculated by the battery ECU 71. The remaining level SOC is calculated by a known method on the basis of, for example, an accumulated value of current flowing into or flowing out from the battery 64, and a voltage of the battery 64. The remaining level SOC is a level that, where dischargeable electric power in the case of the new and fully charged battery 64 is defined as 100% and dischargeable electric power in the case of the completely discharged battery 64 is defined as 0%, expresses the ratio of a current dischargeable electric power of the battery 64 with respect to the dischargeable electric power in the case of new and fully charged battery 64 by percent (%). Note that the remaining level SOC may be expressed by the absolute value of a remaining level (the unit is Wh (watt-hour)).

The PMECU 70 receives a signal that indicates a rotation speed of the first motor generator MG1 (hereinafter, referred to as "MG1 rotation speed Nm1") and a signal that indicates a rotation speed of the second motor generator MG2 (hereinafter, referred to as "MG2 rotation speed Nm2") via the motor ECU 72.

Note that the MG1 rotation speed Nm1 is calculated by the motor ECU 72 on the basis of an output value of a resolver 97 that is provided for the first motor generator MG1 and that outputs an output value corresponding to a rotation angle of a rotor of the first motor generator MG1. Similarly, the MG2 rotation speed Nm2 is calculated by the motor ECU 72 on the basis of an output value of a resolver 98 that is provided for the second motor generator MG2 and that outputs an output value corresponding to a rotation angle of a rotor of the second motor generator MG2.

The PMECU 70 receives various output signals that indicate an engine state via the engine ECU 73. The output signals that indicate an engine state include an engine rotation speed Ne, a throttle valve opening degree TA, an engine coolant temperature THW, and the like.

The PMECU 70 is also connected to a charger 152 that includes an AC/DC converter, and transmits an instruction signal to the charger 152. The charger 152 is connected to an inlet 151 via power lines. Furthermore, an output power line of the charger 152 is connected between the step-up converter 63 and the battery 64. The inlet 151 is allowed to be exposed at the side face of a vehicle body, and a connector of a power cable (not shown) connected to an external power supply is connected to the inlet 151. In a state where the connector of the power cable is connected to the inlet 151, the PMECU 70 controls the charger 152. By so doing, the battery 64 is charged (externally charged) with electric power that is supplied from the external power supply via the power cable. That is, the charger 152 converts alternating-current power, which is supplied from the external power supply to the inlet 151, to direct-current power having a predetermined voltage, and supplies the direct-current voltage to the battery 64.

The battery ECU 71 monitors the state of the battery 64, and calculates the remaining level SOC as described above. Furthermore, the battery ECU 71 estimates (calculates) an outputtable instantaneous power Wout of the battery 64 in accordance with a known method. The outputtable instantaneous power Wout is a value that increases as the remaining level SOC increases.

The motor ECU 72 is connected to the first inverter 61, the second inverter 62 and the step-up converter 63, and transmits instruction signals to these inverters and converter. The motor ECU 72 controls the first motor generator MG1 with the use of the first inverter 61 and the step-up converter 63, and controls the second motor generator MG2 with the use of the second inverter 62 and the step-up converter 63.

The engine ECU 73 is connected to the throttle valve actuator 22a, the fuel injection valves 23, the ignition devices 24, a purge control valve 105 (described later), and the like, which serve as engine actuators, and transmits instruction signals to these actuators. Furthermore, the engine ECU 73 is connected to an air flow meter 91, a throttle valve opening degree sensor 92, an intake air pressure sensor 93, a coolant temperature sensor 94, an engine rotation speed sensor 95, an air-fuel ratio sensor 96, and the like, and acquires output signals that are generated by these sensors.

The air flow meter 91 measures the amount of air taken into the engine 20 per unit time, and outputs a signal that indicates the amount of air (intake air flow rate) Ga. The throttle valve opening degree sensor 92 detects the opening degree of the throttle valve 22 (throttle valve opening degree), and outputs a signal that indicates the detected throttle valve opening degree TA.

The intake air pressure sensor 93 detects the pressure in the intake passage unit at a location downstream of the throttle valve 22, and outputs a signal that indicates the detected intake pipe pressure Pm. The coolant temperature sensor 94 detects the temperature of coolant of the engine 20, and outputs a signal that indicates the detected coolant temperature THW. The coolant temperature THW is a parameter that indicates the warm-up state of the engine 20 (engine temperature parameter that indicates the temperature of the engine 20), and is a parameter that indicates the temperature of the catalyst 28 (catalyst warm-up state parameter). Note that the engine temperature parameter may be the temperature of lubricating oil of the engine 20.

The engine rotation speed sensor 95 generates a pulse signal each time the crankshaft 25 of the engine 20 rotates a predetermined angle. The engine ECU 73 acquires the engine rotation speed Ne on the basis of the pulse signal.

The air-fuel ratio sensor 96 is arranged at the exhaust gas collecting portion of the exhaust manifold 26, and is arranged at a location upstream of the upstream three-way catalyst 28. The air-fuel ratio sensor 96 is a so-called limiting current wide-range, air-fuel ratio sensor. The air-fuel ratio sensor 96 detects the air-fuel ratio of exhaust gas, and outputs an output value Vabyfs based on the detected air-fuel ratio abyfs of exhaust gas. The engine ECU 73 acquires the detected air-fuel ratio abyfs by applying the output value Vabyfs to a look-up table Mapabyfs(Vabyfs).

The engine ECU 73 controls the engine 20 by transmitting instruction signals to the engine actuators on the basis of signals acquired from the above-described sensors, and the like, and commands from the PMECU 70. Note that the engine 20 is provided with a cam position sensor (not shown). The engine ECU 73 acquires a crank angle (absolute crank angle) of the engine 20 with reference to an intake top dead center of a specified cylinder on the basis of signals from the engine rotation speed sensor 95 and the cam position sensor.

Furthermore, the engine 20 includes a fuel vapor gas purge system 100. The fuel vapor gas purge system 100 includes the fuel tank 101, a canister 102, a vapor collection pipe 103, a purge passage pipe 104 and the purge control valve 105.

The fuel tank 101 stores fuel that is supplied from the fuel injection valves 23 to the engine 20. The canister 102 is a known charcoal canister that occludes fuel vapor (fuel vapor gas) produced inside the fuel tank 101. The canister 102 includes a casing that has a tank port 102a, a purge port 102b and an atmosphere port 102c that is exposed to atmosphere. The canister 102 accommodates an adsorbent 102d in the casing. The adsorbent 102d is used to adsorb fuel vapor.

One end of the vapor collection pipe 103 is connected to the upper portion of the fuel tank 101, and the other end of the vapor collection pipe 103 is connected to the tank port 102a. The vapor collection pipe 103 is a pipe that is used to introduce fuel vapor, which is produced inside the fuel tank 101, from the fuel tank 101 into the canister 102.

One end of the purge passage pipe 104 is connected to the purge port 102b, and the other end of the purge passage pipe 104 is connected to the intake passage at a location downstream of the throttle valve 22. The purge passage pipe 104 is a pipe that is used to introduce fuel vapor, which is desorbed from the adsorbent 102d of the canister 102, into the intake passage. The vapor collection pipe 103 and the purge passage pipe 104 constitute a purge passage (purge passage unit).

The purge control valve 105 is interposed in the purge passage pipe 104. The opening degree (valve opening duration) of the purge control valve 105 is adjusted by a drive signal that indicates a duty ratio DPG that is an instruction signal. By so doing, the purge control valve 105 changes the passage cross-sectional area of the purge passage pipe 104. The purge control valve 105 fully closes the purge passage pipe 104 when the duty ratio DPG is "0".

In the thus configured fuel vapor gas purge system 100, when the purge control valve 105 is fully closed, fuel vapor produced inside the fuel tank 101 is occluded by the canister 102. When the purge control valve 105 is open, fuel vapor occluded in the canister 102 is released to the intake passage at a location downstream of the throttle valve 22 via the purge passage pipe 104, and is supplied to the combustion chambers of the internal combustion engine 20. That is, when the purge control valve 105 is open, purging of fuel vapor gas (also referred to as "evaporation purge") is performed.

Next, the operation of the hybrid vehicle 10 through drive control will be described. Note that the process described below is executed by the CPU of the PMECU 70 and the CPU of the engine ECU 73. However, in the following description, for the sake of simple description, the CPU of the PMECU 70 is referred to as "PM", and the CPU of the engine ECU 73 is referred to as "EG".

The hybrid vehicle 10 causes a torque equal to a torque (that is, user required torque) that is required to act on the drive shaft 53 of the vehicle by controlling the output torque of the engine 20 and the output torque of the electric motor (second motor generator MG2) while optimizing the efficiency of the engine 20, that is, while operating the engine 20 at an optimal engine operation point that is an engine operation point in an optimal engine operation line (first engine operation line) (described later). The user required torque is determined on the basis of the user's accelerator operation amount and is required to rotate the drive shaft 53 of the vehicle. At this time, the hybrid vehicle 10 operates the engine 20 at an engine operation point at which the power of the engine 20 satisfies an engine required power and the efficiency of the engine 20 is maximum and at an optimal engine operation point that is determined by an engine generating torque Te and an engine rotation speed Ne. Furthermore, the hybrid vehicle 10 may travel with only the output torque of the second motor generator MG2 on the basis of a driving state.

The hybrid vehicle actually controls the engine 20, the first motor generator MG1 and the second motor generator MG2 in association with one another. As described above, the hybrid vehicle 10 is able to travel in any one of the EV mode and the HV mode.

The EV mode is executed, for example, when the remaining level SOC is higher than or equal to a mode change threshold SOCEVtoHV after external charging. In the EV mode, the vehicle 10 is caused to travel by giving a higher priority to a first driving state (that is, electric travel) than to a second driving state (that is, hybrid travel). In the first driving state, the second motor generator MG2 is driven without operating the engine 20, and the entire driving force of the vehicle 10 is generated from the second motor generator MG2. In the second driving state, the second motor generator MG2 is driven while the engine 20 is operated, and the driving force of the vehicle 10 is generated from both the engine 20 and the second motor generator MG2.

The HV mode is executed, for example, when the remaining level SOC becomes lower than the mode change threshold SOCEVtoHV while the vehicle 10 is travelling in the EV mode. In the HV mode, as compared with the EV mode, the vehicle 10 is caused to travel by giving a higher priority to the second driving state than to the first driving state. These modes are known, and are, for example, described in Japanese Patent Application Publication No. 2011-57115 (JP 2011-57115 A) and Japanese Patent Application Publication No. 2011-57116 (JP 2011-57116 A). These are incorporated into the specification of the present application by reference.

The base of the control in the HV mode is, for example, described in detail in Japanese Patent Application Publication No. 2009-126450 (JP 2009-126450 A) (US 2010/0241297 A), Japanese Patent Application Publication No. 9-308012 (JP 9-308012 A) (U.S. Pat. No. 6,131,680 filed on Mar. 10, 1997), and the like. These are incorporated into the specification of the present application by reference.

Hereinafter, control in the case where the hybrid vehicle 10 is driven in the EV mode will be described in detail. First, drive control in this control will be described. The PM executes an EV mode drive control routine shown by the flowchart in FIG. 2 each time a predetermined period of time elapses.

Figure 2:
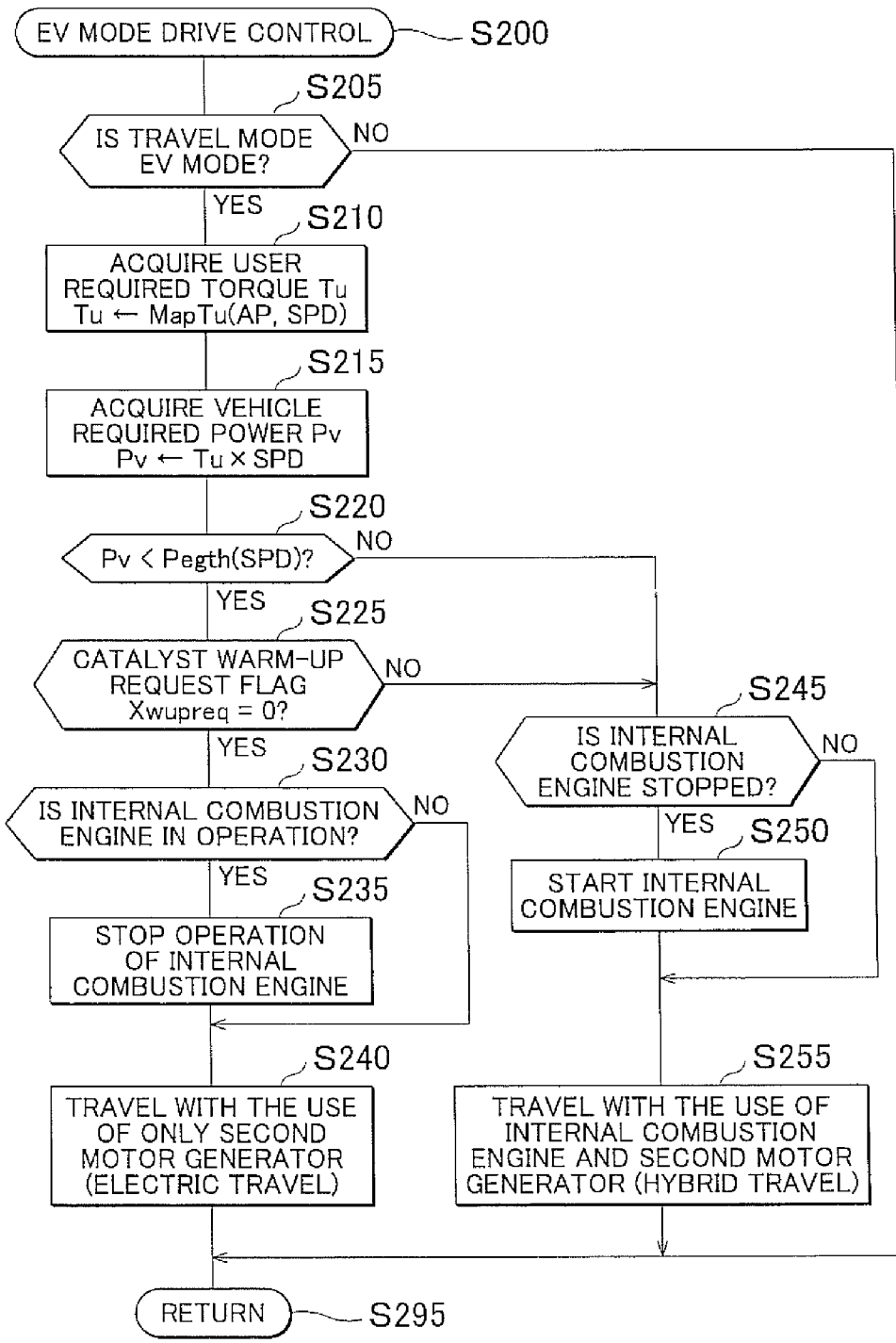
FIG. 2 is a flowchart that shows a routine that is executed by a CPU of a power management ECU shown in FIG. 1.

At appropriate timing, the PM starts the process from step 200 of FIG. 2 and proceeds with the process to step 205, and determines whether the current travel mode is the EV mode. When the current travel mode is not the EV mode (when the current travel mode is the HV mode), the PM makes negative determination in step 205, directly proceeds with the process to step 295, and once ends the routine.

Now, it is assumed that the current travel mode is the EV mode. In this case, the PM makes affirmative determination in step 205 and proceeds with the process to step 210, and determines a user required torque Tu on the basis of the accelerator operation amount AP and the vehicle speed SPD. More specifically, the user required torque Tu is determined so as to increase as the accelerator operation amount AP increases, and is determined so as to reduce as the vehicle speed SPD increases.

Figure 3:
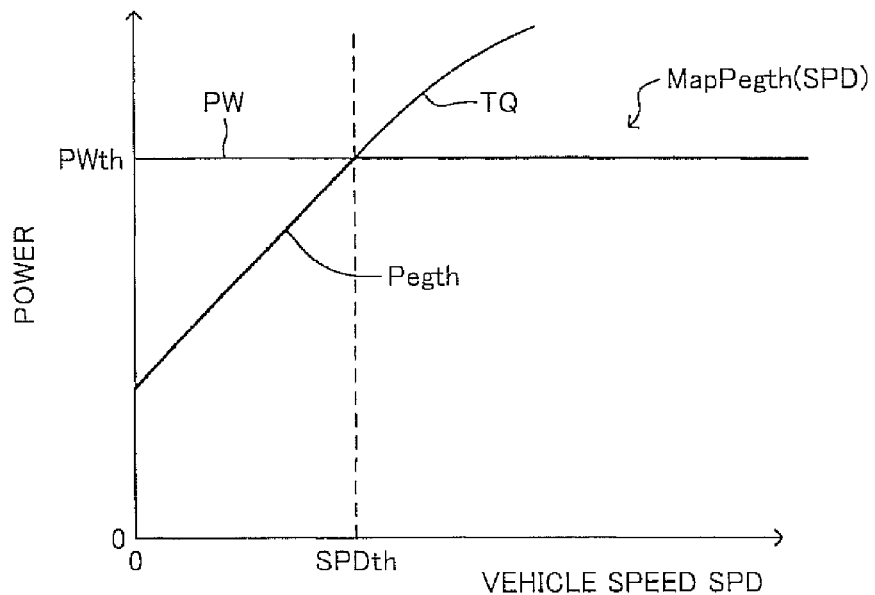
FIG. 3 is a table that is consulted at the time when the CPU of the power management ECU shown in FIG. 1 determines a start power threshold.

Subsequently, the PM proceeds with the process to step 215, and acquires the product of the user required torque Tu and the vehicle speed SPD as a vehicle required power Pv. Subsequently, the PM proceeds with the process to step 220, and determines whether the vehicle required power Pv is smaller than a start power threshold Pegth. The start power threshold Pegth varies on the basis of the vehicle speed SPD as indicated by the wide solid line in FIG. 3. The start power threshold Pegth is determined to a smaller one of a torque requirement threshold indicated by a line TQ and a power requirement threshold indicated by a line PW.

When the vehicle required power Pv is smaller than the start power threshold Pegth, the PM makes affirmative determination in step 220 and proceeds with the process to step 225, and determines whether the value of a catalyst warm-up request flag Xwupreq is "0". Through a routine described later, the value of the catalyst warm-up request flag Xwupreq is set to "1" when the catalyst 28 needs to be warmed up, and is set to "0" when the catalyst 28 does not need to be warmed up.

When the value of the catalyst warm-up request flag Xwupreq is "0", the PM makes affirmative determination in step 225 and proceeds with the process to step 230, and determines whether the engine 20 is in operation. When the engine 20 is in operation, the PM makes affirmative determination in step 230 and proceeds with the process to step 235, and transmits an instruction signal for stopping the operation of the engine 20 to the engine ECU 73. After that, the PM proceeds with the process to step 240. In contrast to this, when the engine 20 is not in operation, the PM makes negative determination in step 230, and proceeds with the process to step 240.

In step 240, the PM controls the second motor generator MG2 such that the vehicle required power Pv is satisfied. As a result, the hybrid vehicle 10 travels with only the power of the second motor generator MG2 (that is, electric travel).

On the other hand, when the vehicle required power Pv is larger than or equal to the start power threshold Pegth at the time point at which the PM executes the process of step 220, the PM makes negative determination in step 220, and proceeds with the process to step 245. Furthermore, when the value of the catalyst warm-up request flag Xwupreq is "1" at the time point at which the PM executes the process of step 225, the PM makes negative determination in step 225, and proceeds with the process to step 245.

In step 245, the PM determines whether the operation of the engine 20 is stopped. When the operation of the engine 20 is stopped, the PM makes affirmative determination in step 245 and proceeds with the process to step 250, and transmits an instruction signal for starting the operation of the engine 20 (instruction signal for starting the engine 20) to the engine ECU 73. After that, the PM proceeds with the process to step 255. In contrast to this, when the engine 20 is in operation, the PM makes negative determination in step 245 and then directly proceeds with the process to step 255.

In step 255, the PM controls the torque of the engine 20 and the torque of the second motor generator MG2 such that the vehicle required power Pv is satisfied. More specifically, the PM causes the engine 20 to generate a power that satisfies the vehicle required power Pv. At that time, the PM determines a target engine output torque Te* and a target engine rotation speed Ne* such that the engine 20 is operated at the optimal engine operation point (operation state where the efficiency of the engine 20 is maximum). The PM brings the engine rotation speed Ne into coincidence with the target engine rotation speed Ne* by controlling the first motor generator MG1, and outputs the target engine output torque Te* to the engine ECU 73. The engine ECU 73 adjusts the opening degree of the throttle valve 22 through a routine (not shown) such that the target engine output torque Te* is output from the engine 20. Furthermore, the PM causes the second motor generator MG2 to generate an insufficient amount of torque when only the output torque of the engine 20 is used. As a result, the hybrid vehicle 10 performs hybrid travel.

In this way, when the vehicle required power Pv is smaller than the start power threshold Pegth and the value of the catalyst warm-up request flag Xwupreq is "0", the hybrid vehicle 10 performs electric travel. In contrast to this, when the vehicle required power Pv is larger than or equal to the start power threshold Pegth or when the value of the catalyst warm-up request flag Xwupreq is "1", the hybrid vehicle 10 performs hybrid travel.

Next, fuel injection amount control will be described. When the EG receives the target engine output torque Te* and the target engine rotation speed Ne* from the PMECU 70, the EG transmits a drive signal to the throttle valve actuator 22a on the basis of the target engine output torque Te* and the target engine rotation speed Ne*, and brings the output torque of the engine 20 into coincidence with the target engine output torque Te*.

Figure 4:
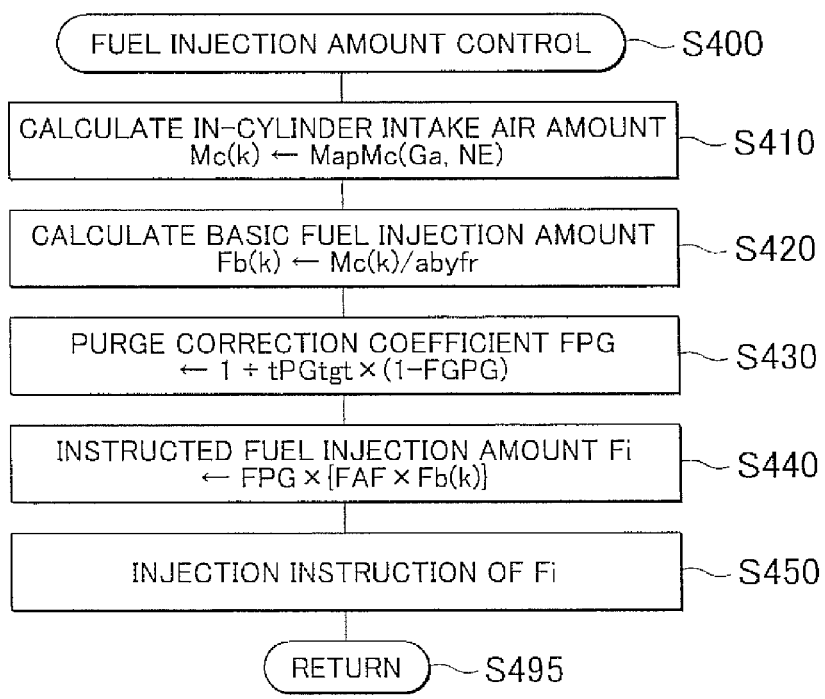
FIG. 4 is a flowchart that shows a routine that is executed by a CPU of an engine ECU shown in FIG. 1.

Furthermore, the EG executes a fuel injection amount control routine shown by the flowchart in FIG. 4 each time a predetermined period of time elapses. Thus, at predetermined timing, the EG starts the process from step 400 in FIG. 4, and sequentially executes the processes of step 410 to step 450 that will be described below, after which the EG proceeds with the process to step 495 and once ends the routine.

In step 410, the EG obtains the intake air amount (in-cylinder intake air amount) Mc(k) that is taken into the cylinder that performs intake stroke (fuel injection cylinder) at the current time point by applying the intake air amount Ga measured by the air flow meter 91 and the engine rotation speed Ne to the look-up table MapMc.

In step 420, the EG obtains a basic fuel injection amount Fb(k) by dividing the in-cylinder intake air amount Mc(k) by a target air-fuel ratio abyfr at the current time point (here, a stoichiometric air-fuel ratio) as shown by the following mathematical expression (1).

$$Fb(k)=Mc(k)/abyfr \quad (1)$$

In step 430, the EG obtains a purge correction coefficient FPG in accordance with the following mathematical expression (2). In the mathematical expression (2), tPGtgt is a target purge rate. The target purge rate tPGtgt is obtained on the basis of the operation state of the engine 20 in a routine shown in FIG. 6 (described later). FGPG is a concentration learned value (fuel vapor gas concentration learned value). The concentration learned value FGPG is obtained through a routine shown in FIG. 5 (described later).

$$FPG=1+tPGtgt(1-FGPG) \quad (2)$$

In step 440, the EG corrects the basic fuel injection amount Fb(k) in accordance with the following mathematical expression (3) to obtain an instructed fuel injection amount Fi that is a final command value of the fuel injection amount. In the mathematical expression (3), FAF is a main feedback coefficient that is updated (calculated) through main feedback control.

$$Fi=FPG \times FAF \times Fb(k) \quad (3)$$

The main feedback coefficient FAF is also referred to as an air-fuel ratio feedback correction amount or a main feedback amount. The main feedback coefficient FAF is calculated on the basis of a known method such that, when a main feedback control condition is satisfied, the main feedback coefficient FAF is gradually reduced when the air-fuel ratio indicated by the output value of the air-fuel ratio sensor 96 (detected air-fuel ratio abyfs) is smaller (richer) than the target air-fuel ratio abyfr, and is gradually increased when the detected air-fuel ratio abyfs is larger (leaner) than the target air-fuel ratio abyfr.

In step 450, the CPU transmits an instruction signal to the fuel injection valve 23, provided in correspondence with the fuel injection cylinder, such that fuel of the instructed fuel injection amount Fi is injected from the fuel injection valve 23.

Next, fuel vapor gas concentration learning will be described. Furthermore, the EG executes a fuel vapor gas concentration learning routine shown in FIG. 5 each time a predetermined period of time elapses. The concentration learned value FGPG is updated by executing this routine.

At predetermined timing, the EG starts the process from step 500 and proceeds with the process to step 510, and determines whether main feedback control is being executed (whether the main feedback coefficient FAF is being updated). At this time, when main feedback control is not executed, the EG makes negative determination in step 510 and directly proceeds with the process to step 595, after which the EG once ends the routine. As a result, the concentration learned value FGPG is not updated.

On the other hand, when main feedback control is being executed, the EG makes affirmative determination in step 510 and proceeds with the process to step 520, and determines whether fuel vapor gas is being purged (specifically, whether the duty ratio DPG that is obtained through the routine of FIG. 6 (described later) is not "0"). At this time, when fuel vapor gas is not being purged, the EG makes negative determination in step 520 and directly proceeds with the process to step 595, after which the EG once ends the routine. As a result, the concentration learned value FGPG is not updated.

On the other hand, when fuel vapor gas is being purged at the time when the EG proceeds with the process to step 520, the EG makes affirmative determination in step 520 and proceeds with the process to step 530, and increases the value of a learned value updating time Tevpg by "1".

Subsequently, the EG proceeds with the process to step 540, and determines whether the learned value updating time Tevpg is longer than or equal to a learned value updating time threshold Tevpgth. At this time, when the learned value updating time Tevpg is shorter than the learned value updating time threshold Tevpgth, the EG makes negative determination in step 540 and directly proceeds with the process to step 595, after which the EG once ends the routine. As a result, the concentration learned value FGPG is not updated.

In contrast to this, when the learned value updating time Tevpg is longer than or equal to the learned value updating time threshold Tevpgth at the time when the EG proceeds with the process to step 540, the EG makes affirmative determination in step 540 and proceeds with the process to step 550, and sets the learned value updating time Tevpg to "0". After that, the EG proceeds with the process to step 560 and the following steps, and updates the concentration learned value FGPG. Thus, as the learned value updating time threshold Tevpgth shortens, the rate of updating (the rate of learning) the concentration learned value FGPG increases. The learned value updating time threshold Tevpgth is set in a routine shown in FIG. 9 (described later).

In step 560, the EG determines whether the absolute value |FAFAV−1| of a value obtained by subtracting "1" from a correction coefficient average FAFAV is larger than or equal to a predetermined value β. Here, the correction coefficient average FAFAV is the average of the main feedback coefficients FAF from time point the learned value updating time threshold Tevpgth before from the current time point to the current time point. β is a small predetermined value that is larger than 0 and smaller than 1, and is, for example, 0.02.

At this time, when the absolute value |FAFAV−1| is larger than or equal to β, the EG makes affirmative determination in step 560 and proceeds with the process to step 570, and obtains an update value tFG in accordance with the following mathematical expression (4). The target purge rate tPGtgt in the mathematical expression (4) is set in the routine shown in FIG. 6. As is apparent from the mathematical expression (4), the update value tFG is a deviation εa (difference obtained by subtracting FAFAV from 1 (=1−FAFAV)) per target purge rate 1%. After that, the EG proceeds with the process to step 590.

$$tFG=(1-FAFAV)/tPGtgt \quad (4)$$

As the concentration of fuel contained in fuel vapor gas increases, the detected air-fuel ratio abyfs becomes an air-fuel ratio smaller than the stoichiometric air-fuel ratio (air-fuel ratio richer than the stoichiometric air-fuel ratio). Thus, the main feedback coefficient FAF becomes a smaller value, so the correction coefficient average FAFAV also becomes a value smaller than "1". As a result, 1−FAFAV becomes a positive value, so the update value tFG becomes a positive value. Furthermore, the absolute value of the update value tFG becomes a larger value as FAFAV reduces (deviates from "1"). That is, as the concentration of fuel vapor gas increases, the update value tFG becomes a positive value having a larger absolute value.

In contrast to this, when the absolute value |FAFAV−1| is smaller than or equal to the value β, the EG makes negative determination in step 560 and proceeds with the process to step 580, and sets the update value tFG to "0". After that, the EG proceeds with the process to step 590.

In step 590, the EG updates the concentration learned value FGPG in accordance with the following mathematical expression (5), and proceeds with the process to step 595, after which the EG once ends the routine. In the mathematical expression (5). FGPGnew is an updated concentration learned value FGPG. As a result, the concentration learned value FGPG becomes a larger value as the concentration of fuel vapor gas increases. Note that the initial value of the concentration learned value FGPG is set to "1".

$$FGPGnew=FGPG+tFG \quad (5)$$

Next, operation for driving the purge control valve will be described. On the other hand, the EG executes the purge control valve driving routine shown in FIG. 6 each time a predetermined period of time elapses. Thus, at predetermined timing, the EG starts the process from step 600 and proceeds with the process to step 605, and determines whether a purge condition is satisfied.

The purge condition is, for example, satisfied when all the following conditions (1) to (3) are satisfied.
(1) Main feedback control is being executed.
(2) A variation ΔKL per unit time in the load KL of the engine 20 is smaller than a first threshold ΔKLevpth.
(3) A variation Δabyfs per unit time in the detected air-fuel ratio abyfs is smaller than a third threshold Δafevpth.

Now, it is assumed that the purge condition is satisfied. In this case, the EG makes affirmative determination in step 605 of FIG. 6 and proceeds with the process to step 610, and determines whether the coolant temperature THW is higher than or equal to a permissible temperature (fuel vapor gas purge permissible temperature) THWevpth. The permissible temperature THWevpth is set in the routine shown in FIG. 9 (described later). More specifically, the permissible temperature THWevpth is set to a relatively low low-side permissible temperature THWevpLo (for example, 30° C.) when aggressive driving operation has been detected, and is set to a relatively high high-side permissible temperature THWevpHi (for example, 40° C.) when aggressive driving operation has not been detected.

When the coolant temperature THW is lower than the permissible temperature THWevpth, the EG makes negative determination in step 610 and proceeds with the process to step 670, and sets the duty ratio DPG to "0". After that, the EG proceeds with the process to step 695 and once ends the routine.

In contrast to this, when the coolant temperature THW becomes higher than or equal to the permissible temperature THWevpth through the operation of the engine 20, the EG makes affirmative determination in step 610 and proceeds with the process to step 615, and determines whether the coolant temperature THWold the predetermined period of time before is lower than the permissible temperature THWevpth. In other words, through the processes of step 610 and step 615, it is determined whether the current time point is timing immediately after the coolant temperature THW has exceeded the permissible temperature THWevpth for the first time.

At this time, when the coolant temperature THWold the predetermined period of time before is lower than the permissible temperature THWevpth, the EG makes affirmative determination in step 615 and proceeds with the process to step 620, and sets the value of a target purge rate increase flag Xup to "1". Subsequently, the EG proceeds with the process to step 625, and determines a final target purge rate PGT on the basis of the concentration learned value FGPG. Here, the final target purge rate PGT is set so as to increase as the concentration learned value FGPG increases. After that, the EG proceeds with the process to step 630. Note that, when the coolant temperature THWold the predetermined period of time before is not lower than the permissible temperature THWevpth at the time point at which the EG executes the process of step 615, the EG makes negative determination in step 615 and directly proceeds with the process to step 630.

In step 630, the EG determines whether the value of the target purge rate increase flag Xup is "1". Now, when it is assumed that the value of the target purge rate increase flag Xup is "1", the EG makes affirmative determination in step 630 and proceeds with the process to step 635, and sets a value obtained by adding a predetermined value (target purge rate increase amount) dPG to the target purge rate tPGtgt at that time point as a new target purge rate tPGtgt. That is, when the value of the target purge rate increase flag Xup is "1", the target purge rate tPGtgt is increased by the value dPG each time the routine is executed (each time the predetermined period of time elapses). Through the routine shown in FIG. 9 (described later), the target purge rate increase amount dPG is set to a relatively small value dPGsmall when aggressive driving operation has been detected, and is set to a relatively large value dPGlarge when aggressive driving operation has not been detected (dPGlarge>dPGsmall).

Subsequently, the EG proceeds with the process to step 640, and determines whether the target purge rate tPGtgt is larger than or equal to the final target purge rate PGT. When the target purge rate tPGtgt is smaller than the final target purge rate PGT, the EG makes negative determination in step 640, mid directly proceeds with the process to step 655.

In contrast to this, when the target purge rate tPGtgt is larger than or equal to the final target purge rate PGT, the EG makes affirmative determination in step 640 and proceeds with the process to step 645, and sets the target purge rate tPGtgt to the final target purge rate PGT. Subsequently, the EG proceeds with the process to step 650, and sets the value of the target purge rate increase flag Xup to "0".

Subsequently, the EG sequentially executes the processes of step 655 to step 665 described below and proceeds with the process to step 695, after which the EG once ends the routine.

In step 655, the EG obtains a fully open purge rate PGRMX by applying the engine rotation speed Ne and the load KL to a map MapPGRMX. The fully open purge rate PGRMX is a purge rate when the purge control valve 105 is fully open. The purge rate is the ratio of a purge flow rate KP with respect to the intake air amount Ga (purge rate=KP/Ga).

The map MapPGRMX is acquired in advance on the basis of an experiment or simulation, and is stored in the ROM. According to the map MapPGRMX, the fully open purge rate PGRMX reduces as the engine rotation speed Ne increases or as the load KL increases.

in step 660, the EG calculates the duty ratio DPG by dividing the target purge rate tPGtgt by the fully open purge rate PGRMX. In step 665, the EG executes open/close control over the purge control valve 105 on the basis of the duty ratio DPG.

Note that, when the value of the target purge rate increase flag Xup is "0" at the time point at which the EG executes the process of step 630, the EG makes negative determination in step 630, and directly proceeds with the process to step 655 and the following steps. Thus, in this case, the target purge rate tPGtgt is not increased. Furthermore, when the purge condition is not satisfied at the time point at which the EG executes the process of step 605, the EG makes negative determination in step 605 and proceeds with the process to step 695 via step 670.

Figure 7:
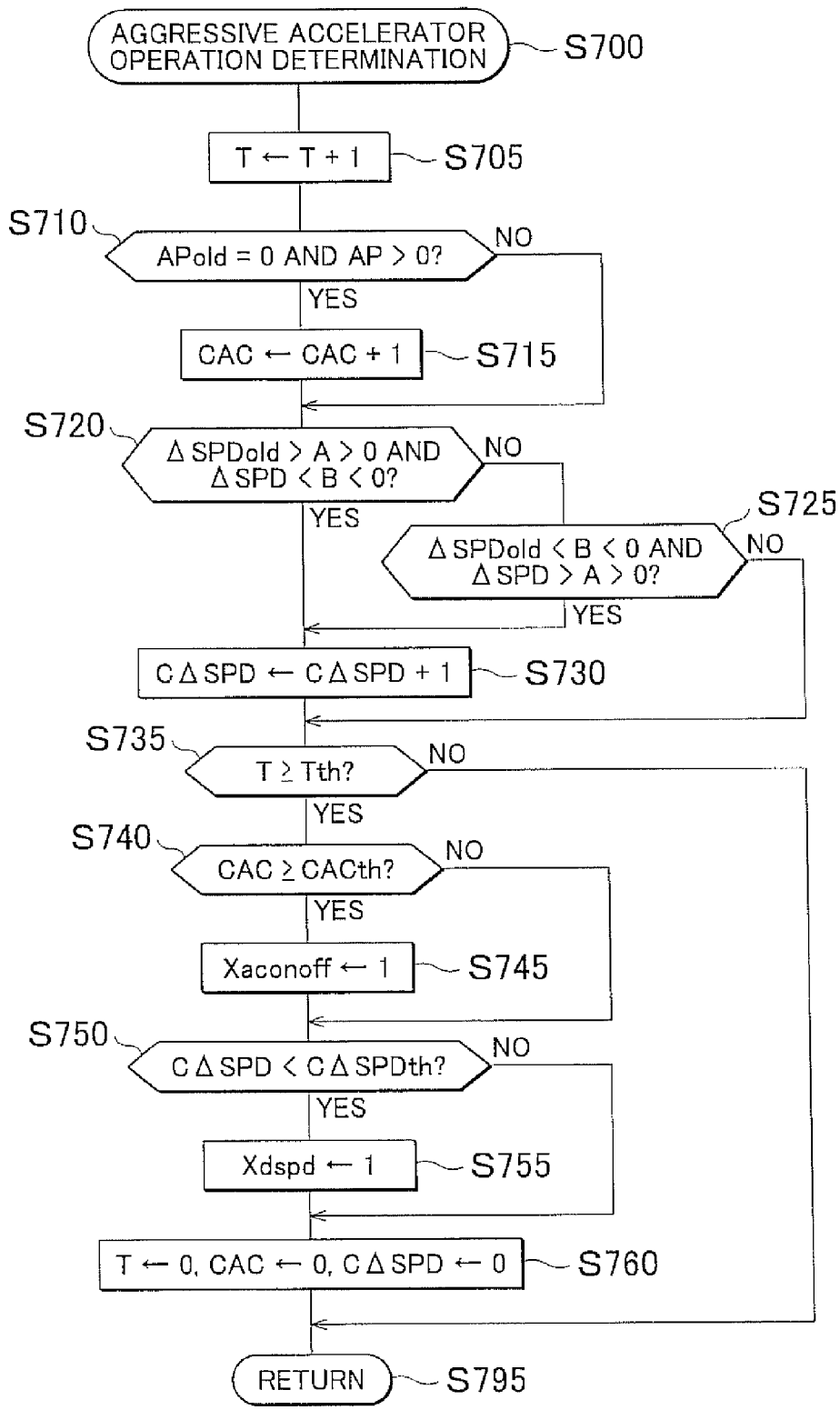
FIG. 7 is a flowchart that shows a routine that is executed by the CPU of the power management ECU shown in FIG. 1.

Next, determination as to aggressive accelerator operation (aggressive driving operation) will be described. Incidentally, the PM executes an aggressive accelerator operation determination routine shown in FIG. 7 each time a predetermined period of time elapses. Thus, at predetermined timing, the PM starts the process from step 700 and proceeds with the process to step 705, and increases the value of a timer T by "1".

Subsequently, the PM proceeds with the process to step 710, and determines whether the last accelerator operation amount APold that is the accelerator operation amount AP the predetermined period of time before from the current time point is "0" and the current accelerator operation amount AP is larger than "0". That is, the PM determines whether the accelerator operation amount AP has changed from zero to non-zero.

When the determination condition of step 710 is satisfied, the PM makes affirmative determination in step 710 and proceeds with the process to step 715, and increases the value of an aggressive accelerator operation counter CAC by "1". After that, the PM proceeds with the process to step 720. In contrast to this, when the determination condition of step 710 is not satisfied, the PM makes negative determination in step 710 and directly proceeds with the process to step 720.

Note that the PM may determine in step 710 whether the current accelerator operation amount AP is zero and the last accelerator operation amount APold is larger than zero. Alternatively, when the PM makes negative determination in step 710, the PM may further determine whether the current accelerator operation amount AP is zero and the last accelerator operation amount APold is larger than zero and may proceed with the process to step 715 when the determination condition is satisfied.

In step 720, the PM determines whether a variation (differential value) ΔSPDold in vehicle speed at the time point the predetermined period of time before from the current time point is larger than a positive threshold A (that is, the vehicle speed SPD is increasing the predetermined period of time before) and a variation (differential value) ΔSPD in vehicle speed at the current time point is smaller than a negative threshold B (that is, the vehicle speed SPD is decreasing at the current time point). When this condition is satisfied, the PM makes affirmative determination in step 720 and proceeds with the process to step 730, and increases the value of a vehicle speed increase/decrease frequency counter CΔSPD by "1".

When the determination condition of step 720 is not satisfied, the PM makes negative determination in step 720 and proceeds with the process to step 725, and determines whether the variation (differential value) ΔSPDold in vehicle speed at the time point the predetermined period of time before from the current time point is smaller than the negative threshold B (that is, the vehicle speed SPD is decreasing the predetermined period of time before) and the variation (differential value) ΔSPD in vehicle speed at the current time point is larger than the positive threshold A (that is, the vehicle speed SPD is increasing at the current time point). When this condition is not satisfied, the PM makes negative determination in step 725 and directly proceeds with the process to step 735. In contrast to this, when the condition of step 725 is satisfied, the PM makes affirmative determination in step 725 and proceeds with the process to step 730, and increases the value of the vehicle speed increase/decrease frequency counter CΔSPD by "1".

Subsequently, the PM proceeds with the process to step 735, and determines whether the value of the timer T is longer than or equal to a time threshold Tth When the value of the timer is shorter than the time threshold Tth, the PM makes negative determination in step 735 and directly proceeds with the process to step 795, after which the PM once ends the routine.

In contrast to this, when the value of the timer T is longer than or equal to the time threshold Tth, the PM makes affirmative determination in step 735 and proceeds with the process to step 740, and determines whether the value of the counter CAC is larger than or equal to an accelerator operation determination threshold (fourth threshold) CACth. When the value of the counter CAC is larger than or equal to the fourth threshold CACth, the PM makes affirmative determination in step 740 and proceeds with the process to step 745, and sets the value of the aggressive accelerator operation flag Xaconoff to "1". After that, the PM proceeds with the process to step 750.

In contrast to this, when the value of the counter CAC is smaller than the fourth threshold CACth, the PM makes negative determination in step 740 and directly proceeds with the process to step 750. Note that the value of the operation flag Xaconoff is set to "0" when the system enters a ready-on state. Furthermore, the value of the operation flag Xaconoff may be set to "0" when negative determination is made in step 740. The value of the operation flag Xaconoff is transmitted from the PMECU 70 to the engine ECU 73.

In step 750, the PM determines whether the value of the vehicle speed increase/decrease frequency counter CΔSPD is smaller than a vehicle speed increase/decrease frequency threshold C (fifth threshold) ΔSPDth. At this time, when the value of the counter CΔSPD is smaller than the fifth threshold CΔSPDth, the PM makes affirmative determination in step 750 and proceeds with the process to step 755, and sets the value of a constant vehicle speed flag Xdspd to "1". Subsequently, the PM proceeds with the process to step 760.

In contrast to this, when the value of the counter CΔSPD is larger than or equal to the fifth threshold CΔSPDth, the PM makes negative determination in step 750 and directly proceeds with the process to step 760. Note that the value of the constant vehicle speed flag Xdspd is set to "0" when the system enters a ready-on state. Furthermore, the value of the constant vehicle speed flag Xdspd may be set to "0" when negative determination is made in step 750. The value of the constant vehicle speed flag Xdspd is transmitted from the PMECU 70 to the engine ECU 73.

The PM sets the values of the timer T, counter CAC and counter CΔSPD to "0" in step 760 and proceeds with the process to step 795, after which the PM once ends the routine.

In this way, the PM sets the value of the aggressive accelerator operation flag Xaconoff to "1" when the number of times the accelerator operation amount AP is changed from zero to non-zero (or from non-zero to zero) is larger than or equal to the accelerator operation determination threshold CACth in a period during which a period of time corresponding to the time threshold Tth elapses, and sets the value of the constant vehicle speed flag Xdspd to "1" when the number of times the vehicle speed is increased and decreased (or decreased and increased) is smaller than the vehicle speed increase/decrease frequency threshold CΔSPDth.

Figure 8:
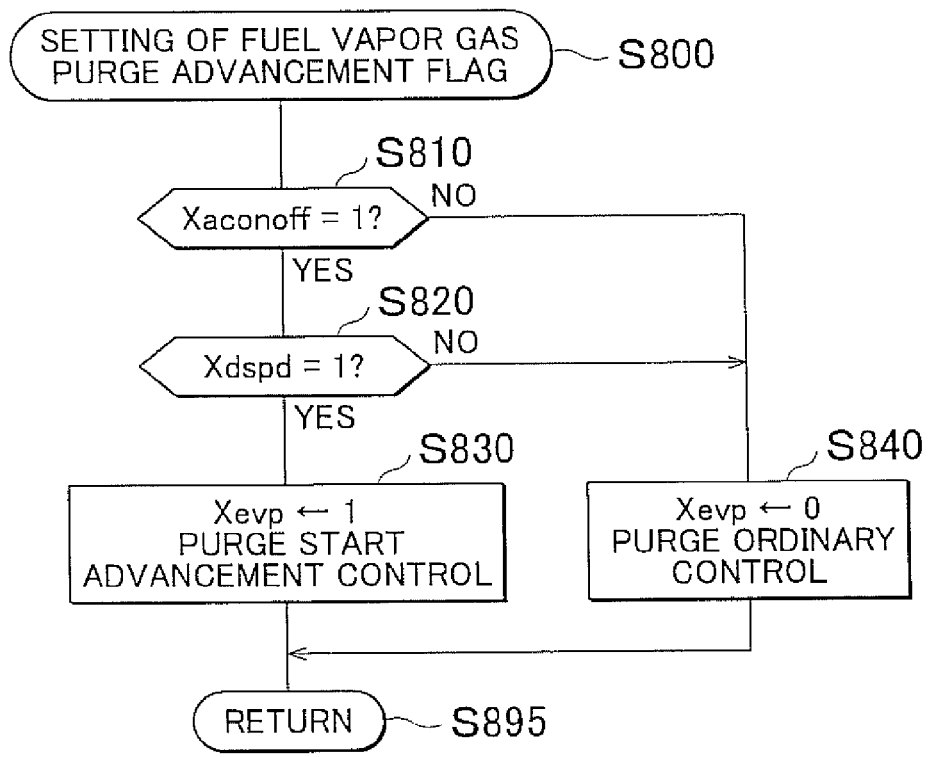
FIG. 8 is a flowchart that shows a routine that is executed by the CPU of the engine ECU shown in FIG. 1.

Next, setting of a fuel vapor gas purge advancement flag will be described. The EG executes a fuel vapor gas purge advancement flag setting routine shown in FIG. 8 each time a predetermined period of time elapses. Thus, at predetermined timing, the EG starts the process from step 800 and proceeds with the process to step 810, and determines whether the value of the flag Xaconoff is "1".

When the value of the flag Xaconoff is "1", the EG makes affirmative determination in step 810 and proceeds with the process to step 820, and determines whether the value of the flag Xdspd is "1".

When the value of the flag Xdspd is "1", the EG makes affirmative determination in step 820 and proceeds with the process to step 830, and sets the value of the fuel vapor gas purge advancement flag Xevp to "1". After that, the EG proceeds with the process to step 895, and once ends the routine. That is, the value of the flag Xevp is set to "1" when the value of the flag Xaconoff is "1" and the value of the flag Xdspd is "1".

In contrast to this, when the value of the flag Xaconoff is not "1", the EG makes negative determination in step 810 and proceeds with the process to step 840, and sets the value of the flag Xevp to "0". After that, the EG proceeds with the process to step 895, and once ends the routine.

Similarly, when the value of the flag Xdspd is not "1", the EG makes negative determination in step 820 and proceeds with the process to step 840, and sets the value of the flag Xevp to "0". After that, the EG proceeds with the process to step 895, and once ends the routine.

Next, setting of a fuel vapor gas purge control parameter will be described. The EG executes a fuel vapor gas purge control parameter setting routine shown in FIG. 9 each time a predetermined period of time elapses. Thus, at predetermined timing, the EG starts the process from step 900 and proceeds with the process to step 910, and determines whether the value of the flag Xevp is "1".

When the value of the flag Xevp is "1", the EG makes affirmative determination in step 910, sequentially executes the processes of step 920 to step 950 described below, and, after that, proceeds with the process to step 995, after which the EG once ends the routine.

In step 920, the EG sets the permissible temperature THWevpth to the low-side permissible temperature THWevpLo (for example, 30° C.). In step 930, the EG sets the learned value updating time threshold Tevpgth to a relatively short period of time (first period of time) Tshort. In step 940, the EG sets the target purge rate increase amount dPG to a relatively small value (first target purge rate increase amount) dPGsmall. In step 950, the EG sets a catalyst warm-up end coolant temperature THWwupendth to a relatively high temperature (first catalyst warm-up end coolant temperature) THWwupendHi.

In contrast to this, when the value of the flag Xevp is "0", the EG makes negative determination in step 910, sequentially executes the processes of step 960 to step 990 described below, and, after that, proceeds with the process to step 995, after which the EG once ends the routine.

In step 960, the EG sets the permissible temperature THWevpth to the high-side permissible temperature THWevpHi (for example, 40° C.). The high-side permissible temperature THWevpHi is higher than the low-side permissible temperature THWevpLo. In step 970, the EG sets the learned value updating time threshold Tevpgth to a relatively long period of time (second period of time) Tlong. The second period of time Tlong is longer than the first period of time Tshort. In step 980, the EG sets the target purge rate increase amount dPG to a relatively large value (second target purge rate increase amount) dPGlarge. The second target purge rate increase amount dPGlarge is larger than the first target purge rate increase amount dPGsmall. In step 990, the EG sets the catalyst warm-up end coolant temperature THWwupendth to a relatively low temperature (second catalyst warm-up end coolant temperature) THWwupendLo. The coolant temperature THWwupendLo is lower than the coolant temperature THWwupendHi.

Figure 10:
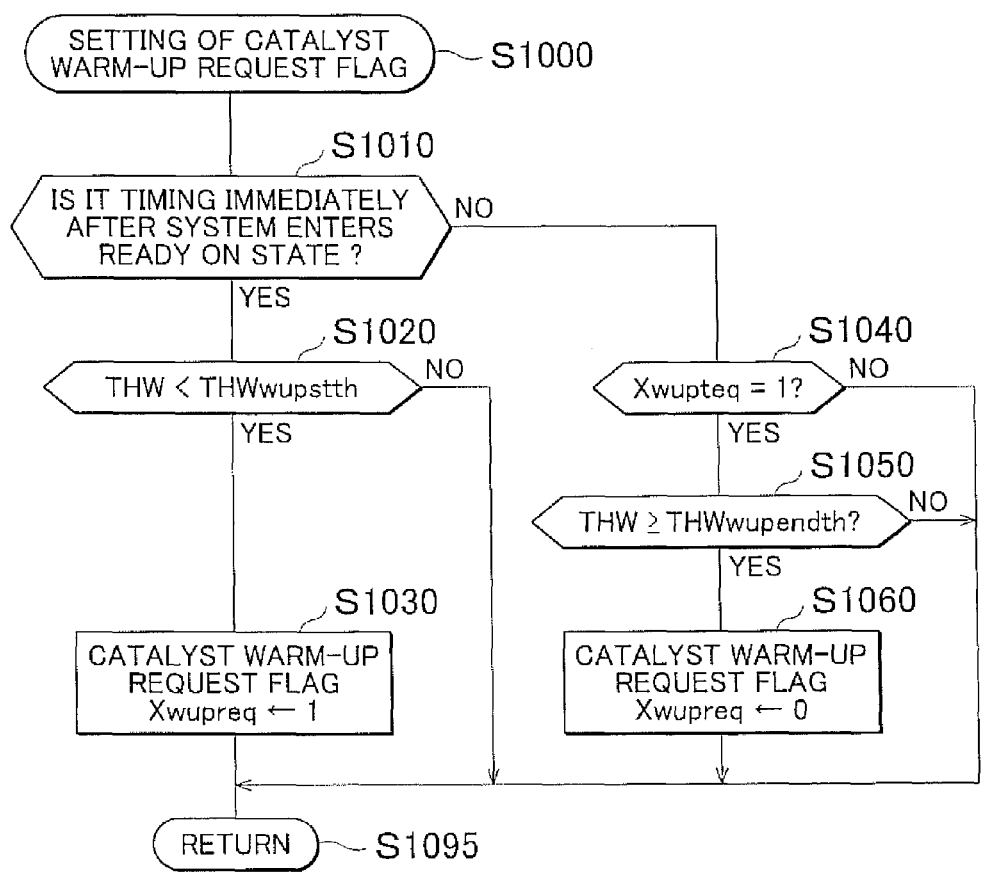
FIG. 10 is a flowchart that shows a routine that is executed by the CPU of the engine ECU shown in FIG. 1.

Next, setting of a catalyst warm-up request flag will be described. The EG executes a catalyst warm-up request flag setting routine shown in FIG. 10 each time a predetermined period of time elapses. Thus, at predetermined timing, the EG starts the process from step 1000 and proceeds with the process to step 1010, and determines whether the current time point is timing immediately after a start-up of the system (immediately after the system enters a ready-on state).

When the current time point is timing immediately after a start-up of the system, the EG makes affirmative determination in step 1010 and proceeds with the process to step 1020, and determines whether the coolant temperature THW is lower than a catalyst warm-up start request coolant temperature THWwupstth. When the coolant temperature THW is lower than the coolant temperature THWwupstth, the EG makes affirmative determination in step 1020 and proceeds with the process to step 1030, and sets the value of the catalyst warm-up request flag Xwupreq to "1". The value of the flag Xwupreq is transmitted to the PMECU 70. As a result, the PM makes negative determination in step 225 of FIG. 2, so the operation of the engine 20 is not stopped but is continued. Note that the value of the flag Xwupreq is set to "0" at the time of a start-up of the system.

In contrast to this, when the coolant temperature THW is higher than or equal to the coolant temperature THWwupstth, the EG makes negative determination in step 1020 and directly proceeds with the process to step 1095, after which the EG once ends the routine.

Furthermore, when the time point at which the EG executes the process of step 1010 is not the timing immediately after a start-up of the system, the EG makes negative determination in step 1010 and proceeds with the process to step 1040, and determines whether the value of the flag Xwupreq is "1". At this time, when the value of the flag Xwupreq is not "1", the PM makes negative determination in step 1040 and directly proceeds with the process to step 1095, after which the PM once ends the routine.

In contrast to this, when the value of the flag Xwupreq is "1", the PM makes affirmative determination in step 1040 and proceeds with the process to step 1050, and determines whether the coolant temperature THW is higher than or equal to the catalyst warm-up end coolant temperature TFWwupendth. The coolant temperature THWwupendth is higher than the coolant temperature THWwupstth, and is set in the routine shown in FIG. 9 described above. When the coolant temperature THW is higher than or equal to the coolant temperature THWwupendth, the EG makes affirmative determination in step 1050 and proceeds with the process to step 1060, and sets the value of the catalyst warm-up request flag Xwupreq to "0". As a result, the PM makes affirmative determination in step 225 of FIG. 2, so the operation of the engine 20 is intermittently stopped.

When the coolant temperature THW is lower than the coolant temperature THWwupendth at the time point at which the EG executes the process of step 1050, the EG makes negative determination in step 1050 and directly proceeds with the process to step 1095, after which the EG once ends the routine.

Figure 6:
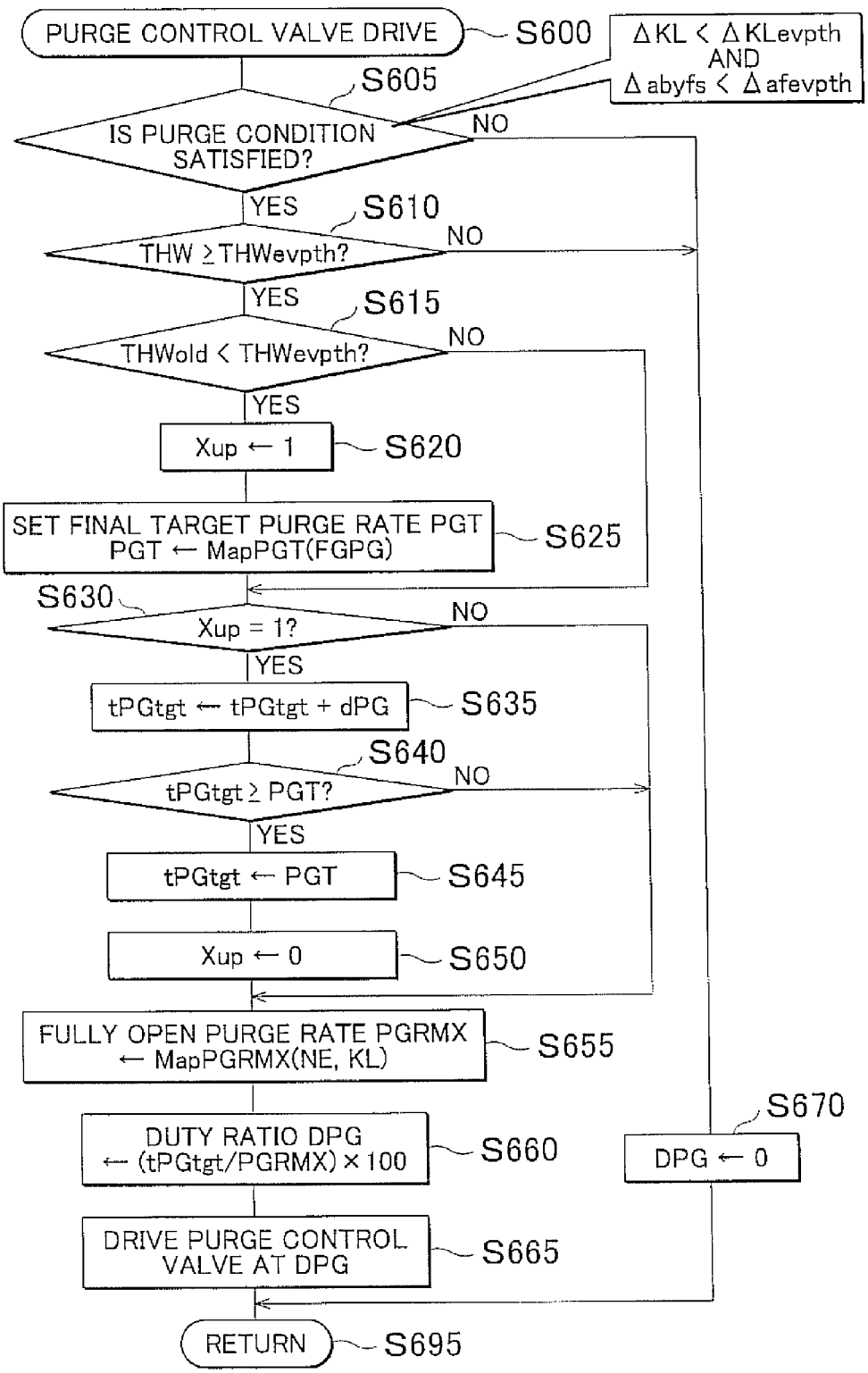
FIG. 6 is a flowchart that shows a routine that is executed by the CPU of the engine ECU shown in FIG. 1.

As described above, the hybrid vehicle 10 according to the embodiment of the invention performs intermittent operation in which the operation of the engine 20 is stopped when a predetermined operation stop condition is satisfied (see step 220 to step 235 of FIG. 2) and the operation of the engine 20 is started when a predetermined start condition is satisfied (see step 220, step 225, step 245 and step 250 of FIG. 2), and includes a drive control unit that causes the hybrid vehicle 10 to travel by applying a torque based on the accelerator operation amount AP to the drive shaft through control over torque that is generated by the engine 20 and torque that is generated by the second motor generator MG2 (see step 240 and step 255 of FIG. 2) and a purge control unit (the routine shown in FIG. 6) that causes the fuel vapor gas purge system 100 to purge fuel vapor gas when the temperature of the engine (for example, coolant temperature THW) is higher than or equal to the permissible temperature THWevpth and the variation ΔKL per unit time in the load of the engine 20 is smaller than the first threshold ΔKLevpth (see step 605 of FIG. 6).

Figure 9:
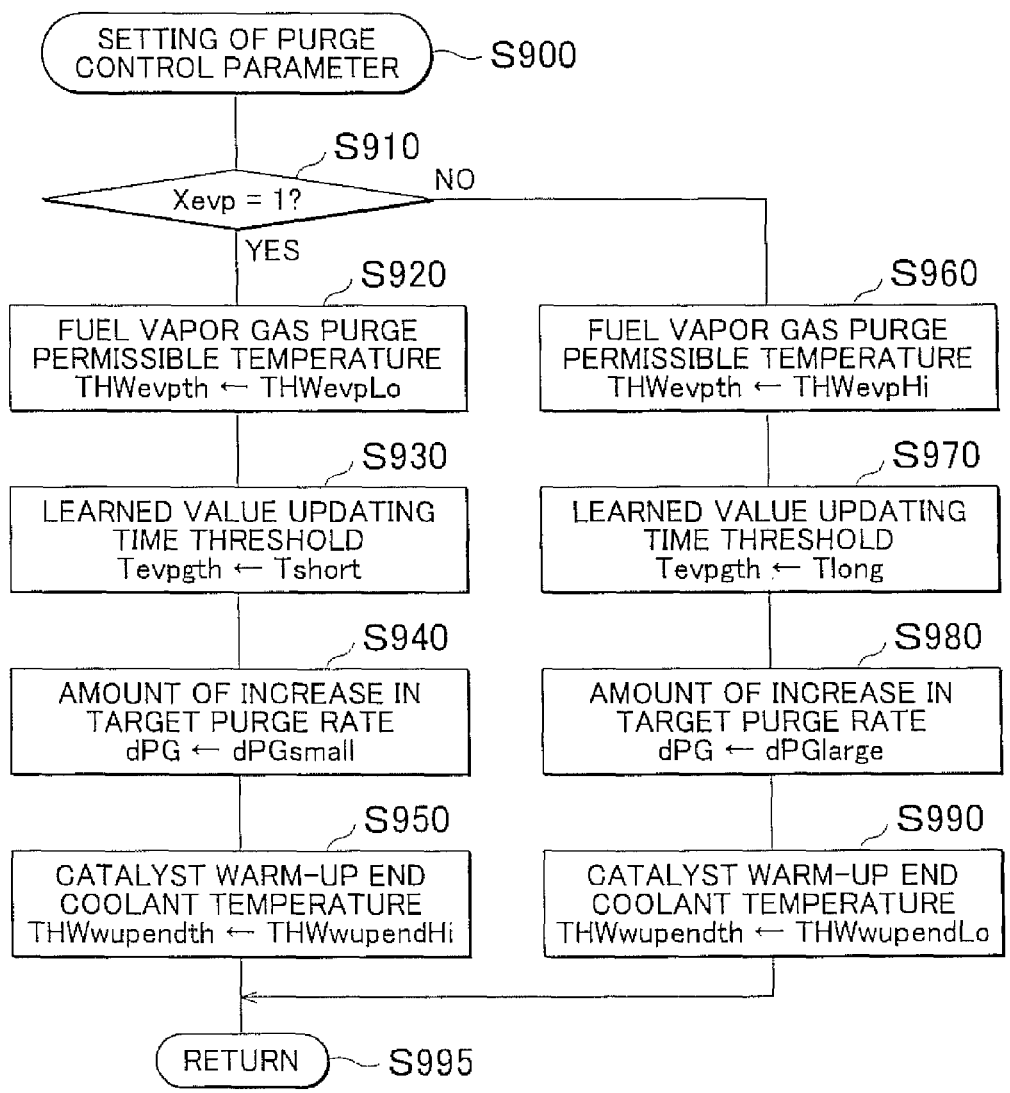
FIG. 9 is a flowchart that shows a routine that is executed by the CPU of the engine ECU shown in FIG. 1.

The purge control unit is configured to set the permissible temperature THWevpth to a value lower when a specific driving operation state has been detected (see the routine of FIG. 7 and step 810 to step 830 of FIG. 8) than that when the specific driving operation state has not been detected (see step 910, step 920 and step 960 of FIG. 9). The specific driving operation state includes a state in which the number of times the accelerator operation amount has changed from zero to non-zero per unit time and/or the number of times the accelerator operation amount has changed from non-zero to zero per unit time (aggressive accelerator operation counter CAC) is larger than or equal to a predetermined second threshold (accelerator operation determination threshold CACth).

With this configuration, fuel vapor gas starts to be purged at the time point at which the temperature of the engine 20 is lower when the specific driving operation state has been detected than when the specific driving operation state has not been detected. That is, when the specific driving operation state has been detected, it is possible to advance the timing at which fuel vapor gas starts to be purged. As a result, even when aggressive driving operation in which the frequency of purging fuel vapor gas is low because a variation in load per unit time increases, it is possible to ensure the amount of purge of fuel vapor gas.

Furthermore, the drive control unit includes an injection amount control unit. The injection amount control unit calculates a feedback correction amount FAF, learns a concentration learned value FGPG on the basis of the feedback correction amount FAF in a period during which purging of fuel vapor gas is being carried out (see the routine of FIG. 5), and determines the amount of fuel that is injected from each fuel injection valve 23 by correcting the basic fuel injection amount using the feedback correction amount FAF and a purge correction amount FPG determined on the basis of the concentration learned value FGPG (see the routine of FIG. 4).

Figure 5:
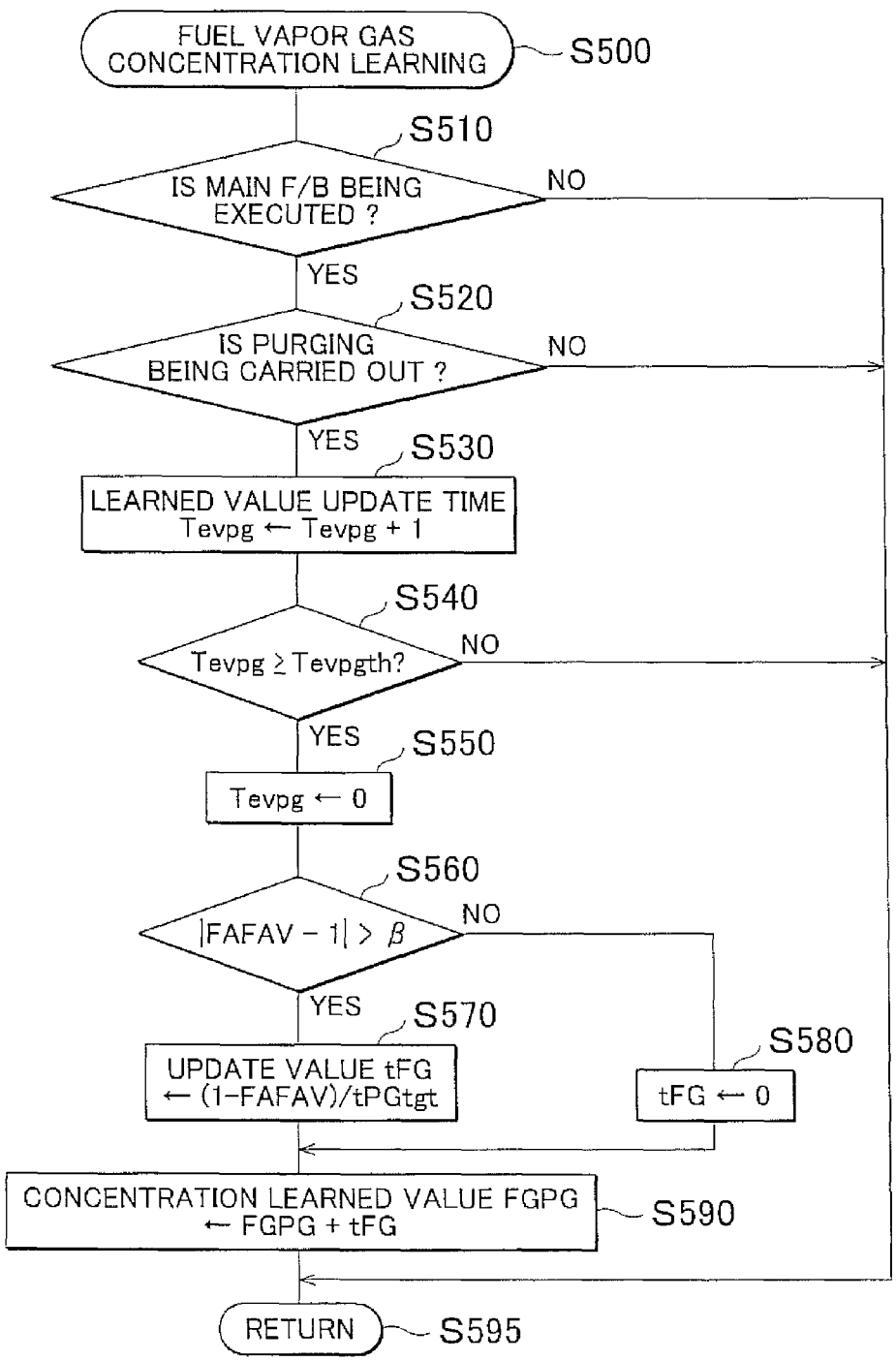
FIG. 5 is a flowchart that shows a routine that is executed by the CPU of the engine ECU shown in FIG. 1.

Furthermore, the injection amount control unit is configured to increase the updating rate of the concentration learned value FGPG when the specific driving operation state has been detected as compared with when the specific driving operation state has not been detected (see step 930 and step 970 of FIG. 9 and step 530 and step 540 of FIG. 5).

Thus, when fuel vapor gas early starts to be purged because the specific driving operation (aggressive driving operation) is performed, it is possible to early increase the accuracy of the concentration learned value. In addition, the amount of purge of fuel vapor gas (for example, the final target purge rate PGT) is set on the basis of the concentration learned value FGPG (see step 625 of FIG. 6), it is possible to properly set the amount of purge of fuel vapor gas.

Furthermore, the purge control unit is configured to decrease the rate of increase in the purge rate after fuel vapor gas starts to be purged when the specific driving operation state has been detected as compared with when the specific driving operation state has not been detected (see step 940 and step 980 of FIG. 9 and step 635 of FIG. 6). Thus, even when the timing at which fuel vapor gas starts to be purged is advanced, it is possible to suppress deterioration of emissions.

Furthermore, the hybrid vehicle 10 sets the catalyst warm-up end coolant temperature THWwupendth in the case where aggressive driving operation has been detected to a higher value than the catalyst warm-up end coolant temperature THWwupendth in the case where aggressive driving operation has not been detected (step 950 and step 990 of FIG. 9). As a result, the time point of the end of a catalyst warm-up request delays. In other words, the frequency at which the operation of the engine 20 is stopped through intermittent operation decreases (see the routine of FIG. 10 and negative determination in step 225 of FIG. 2). Thus, it is possible to ensure the amount of purge of fuel vapor gas when the specific driving operation has been detected.

The invention is not limited to the above-described embodiment; various alternative embodiments may be employed within the scope of the invention. For example, when the hybrid vehicle 10 is operated in the HV mode as well, it is possible to advance the timing at which fuel vapor gas starts to be purged, increase the learning rate of the concentration learned value FGPG and decrease the rate of increase in target purge rate as in the case of the above-described embodiment.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A hybrid vehicle comprising:
an internal combustion engine serving as a drive source of the hybrid vehicle;
an electric motor serving as a drive source of the hybrid vehicle;
a fuel vapor gas purge system configured to carry out purging of fuel vapor gas for introducing fuel vapor produced inside a fuel tank into an intake passage of the internal combustion engine, the fuel tank storing fuel supplied to the internal combustion engine;
a drive control unit configured to carry out intermittent operation for stopping operation of the engine when a predetermined operation stop condition is satisfied and starting the operation of the engine when a predetermined start condition is satisfied, the drive control unit being configured to cause the hybrid vehicle to travel by applying torque based on an accelerator operation amount to a drive shaft through control over torque generated by the engine and torque generated by the electric motor; and
a purge control unit configured to carry out the purging of fuel vapor gas when a temperature of the engine is higher than or equal to a permissible temperature and a variation per unit time in a load of the engine is smaller than a first threshold, the purge control unit being configured to set the permissible temperature to a value lower when a specific driving operation state has been detected than when the specific driving operation state has not been detected, the specific driving operation state including a state where the number of times the accelerator operation amount has changed from zero to non-zero per unit time or the number of times the accelerator operation amount has changed from non-zero to zero per unit time is larger than or equal to a predetermined second threshold,
the purge control unit is configured to gradually increase a purge rate from a time point at which the temperature of the engine becomes higher than or equal to the permissible temperature, the purge rate being the ratio of a flow rate of fuel vapor gas introduced into the intake passage with respect to an intake air flow rate of the engine, and the purge control unit is configured to reduce a rate of increase in the purge rate when the specific driving operation state has been detected as compared with when the specific driving operation state has not been detected.

2. The hybrid vehicle according to claim 1, wherein
the drive control unit includes an injection amount control unit configured to calculate a basic fuel injection amount on the basis of an intake air amount of the engine, to calculate a feedback correction amount for correcting an amount of fuel injected from a fuel injection valve in a feedback manner such that an air-fuel ratio indicated by an output value of an air-fuel ratio sensor arranged in an exhaust passage of the engine coincides with a predetermined target air-fuel ratio, to learn a concentration of the fuel vapor gas as a concentration learned value on the basis of the feedback correction amount in a period during which the purging of fuel vapor gas is being carried out, and to determine the amount of fuel injected from the fuel injection valve by correcting the basic fuel injection amount using the feedback correction amount and a purge correction amount set on the basis of the concentration learned value, and
the injection amount control unit is configured to increase an updating rate of the concentration learned value when the specific driving operation state has been detected as compared with when the specific driving operation state has not been detected.

3. A control method for a hybrid vehicle, the hybrid vehicle including an internal combustion engine and an electric motor as drive sources and including a fuel vapor gas purge system, the fuel vapor gas purge system being configured to carry out purging of fuel vapor gas for introducing fuel vapor produced inside a fuel tank into an intake passage of the engine, the fuel tank storing fuel supplied to the engine, the control method comprising:
carrying out intermittent operation for stopping operation of the engine when a predetermined operation stop condition is satisfied and starting the operation of the engine when a predetermined start condition is satisfied, and causing the hybrid vehicle to travel by applying torque based on an accelerator operation amount to a drive shaft through control over torque generated by the engine and torque generated by the electric motor;
carrying out the purging of fuel vapor gas when a temperature of the engine is higher than or equal to a permissible temperature and when a variation per unit time in a load of the engine is smaller than a first threshold;
setting the permissible temperature to a value lower when a specific driving operation state has been detected than when the specific driving operation state has not been detected, the specific driving operation state including a state where the number of times the accelerator operation amount has changed from zero to non-zero per unit time or the number of times the accelerator operation amount has changed from non-zero to zero per unit time is larger than or equal to a predetermined second threshold;
gradually increasing a purge rate from time point at which the temperature of the engine becomes higher than or equal to the permissible temperature, the purge rate being the ratio of a flow rate of fuel vapor gas introduced into the intake passage with respect to an intake air flow rate of the engine, and the purge control unit is configured to reduce; and
reducing a rate of increase in the purge rate when the specific driving operation state has been detected as compared with when the specific driving operation state has not been detected.

* * * * *

UNITED STATES PATENT AND TRADEMARK OFFICE
CERTIFICATE OF CORRECTION

| | | |
|---|---|---|
| PATENT NO. | : 9,242,639 B2 | |
| APPLICATION NO. | : 13/855369 | |
| DATED | : January 26, 2016 | |
| INVENTOR(S) | : Shunsuke Fushiki | |

It is certified that error appears in the above-identified patent and that said Letters Patent is hereby corrected as shown below:

Specification

In column 16, Line 65, delete "mid" and insert --and--, therefor.

Signed and Sealed this
Twenty-sixth Day of April, 2016

Michelle K. Lee
*Director of the United States Patent and Trademark Office*